US012579155B2

(12) United States Patent
Xu et al.

(10) Patent No.: US 12,579,155 B2
(45) Date of Patent: Mar. 17, 2026

(54) SYSTEMS AND METHODS FOR INTERFACE GENERATION USING EXPLORE AND EXPLOIT STRATEGIES

(71) Applicant: Walmart Apollo, LLC, Bentonville, AR (US)

(72) Inventors: Dong Xu, Sunnyvale, CA (US); Di Ai, Sunnyvale, CA (US); Xinzi Sun, Redwood City, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 126 days.

(21) Appl. No.: 18/489,405

(22) Filed: Oct. 18, 2023

(65) Prior Publication Data

US 2025/0131003 A1     Apr. 24, 2025

(51) Int. Cl.
*G06F 16/2457*        (2019.01)
*G06F 16/248*         (2019.01)

(52) U.S. Cl.
CPC ...... *G06F 16/248* (2019.01); *G06F 16/24575* (2019.01)

(58) Field of Classification Search
None
See application file for complete search history.

(56) References Cited

U.S. PATENT DOCUMENTS

| | | | | |
|---|---|---|---|---|
| 10,242,381 B1 * | 3/2019 | Zappella | ............ | G06Q 30/0245 |
| 10,332,015 B2 | 6/2019 | Kawale et al. | | |
| 10,685,374 B2 | 6/2020 | Shah et al. | | |

| | | | | |
|---|---|---|---|---|
| 11,455,655 B2 | 9/2022 | Taghavi Nasr Abadi et al. | | |
| 11,763,338 B1 * | 9/2023 | Tran | .................. | G06Q 30/0251 |
| | | | | 705/14.41 |
| 2017/0039198 A1 * | 2/2017 | Ramamurthy | ........ | G06F 16/904 |
| 2021/0224750 A1 * | 7/2021 | Duan | .................. | G06F 16/9535 |
| 2022/0148062 A1 * | 5/2022 | Sinha | .................... | G06N 20/00 |
| 2022/0284476 A1 | 9/2022 | Yang et al. | | |
| 2024/0202760 A1 * | 6/2024 | Sethuraman | ....... | G06Q 30/0206 |

FOREIGN PATENT DOCUMENTS

CN          109493136 A      3/2019

OTHER PUBLICATIONS

Ai, Qingyao, et al., "Learning a Hierarchical Embedding Model for Personalized Product Search", ACM SIGIR 2017, Aug. 2017, pp. 645-654. (Year: 2017).*

* cited by examiner

*Primary Examiner* — Scott A. Waldron
(74) *Attorney, Agent, or Firm* — Jones Day

(57) ABSTRACT

Systems and methods of generating an interface are disclosed. A request for an interface including a search query is received and a set of search results are generated via a search engine. A set of initial content campaigns are selected based on a category associated with the search query and are filtered based on a similarity score generated for the search query and each content campaign to generate a set of candidate content campaigns. The set of candidate content campaigns is filtered based on an exploration content score and an exploitation content score to generate a set of final content campaigns. An interface is generated including at least one content element selected from the set of final content campaigns and at least one content element selected from the set of search results. The interface is transmitted to the requesting system, which is configured to display the interface on a display.

20 Claims, 13 Drawing Sheets

200

Receive Interface Request ⟩202

Provide Request to Interface Generation Engine ⟩204

Obtain Content Elements Responsive to Query ⟩206

Generate Amplified Content Request ⟩208

Receive Set of Final Content Campaigns ⟩210

Generate Interface including Amplified Content Elements ⟩212

Receive Feedback Data ⟩214

Generate Updated Models ⟩216

300

Receive Amplified Content Request ～302

Generate Set of Initial Content Campaigns ～304

Generate Set of Candidate Content Campaigns ～306

Generate Content Score(s) ～308

Output Amplification Content Elements ～310

500

Receive Training Dataset
502

Process and Normalize Training Dataset
504

Execute Iterative Training Process
506

Training Complete?
508

No

Yes

Output Trained Model
510

Evaluate Trained Model
512

SYSTEMS AND METHODS FOR INTERFACE GENERATION USING EXPLORE AND EXPLOIT STRATEGIES

TECHNICAL FIELD

This application relates generally to generation of user interfaces, and more particularly, to generating user interfaces including content elements selected using explore and exploit strategies.

BACKGROUND

When generating user interfaces for presentation to users via one or more devices, some current systems include content elements that are selected from predefined sets in the generated interface. The selected content elements can be presented in predetermined portions of the generated interface. Although current systems can present content elements from the predefined sets, such systems provide only a broad match between the content elements in the predefined sets and other content provided in response to a user request for an interface.

In some current systems, a user can request an interface by providing a search query. The generated interface can include search results relevant to the search query and additional content elements selected from the predefined sets. Although some current systems can provide a broad match between categories of content associated with the search results and the additional content elements, such systems are not able to identify additional content elements having a higher relevancy to the user. In addition, these systems are not able to balance exposure to a broad range of content elements with presentation of relevant content elements.

SUMMARY

In various embodiments, a system is disclosed. The system includes a non-transitory memory, a database configured to store a plurality of content campaigns, and a processor communicatively coupled to the non-transitory memory. Each content campaign in the plurality of content campaigns includes at least one content element. The processor is configured to read a set of instructions to receive a request for an interface including a search query from a request device, generate a set of search results responsive to the search query via a search engine, select a set of initial content campaigns from the database based on a category associated with the search query, filter the set of initial content campaigns based on a similarity score generated for the search query and each content campaign in the set of initial content campaigns to generate a set of candidate content campaigns, filter the set of candidate content campaigns based on an exploration content score and an exploitation content score to generate a set of final content campaigns, generate an interface including at least one content element selected from the content elements associated with a content campaign in the set of final content campaigns and at least one content element selected from the set of search results, and transmit the interface to the requesting system. The requesting system is configured to display the interface on a display associated with the requesting system.

In various embodiments, a computer-implemented method is disclosed. The computer-implemented method includes the steps of receiving a request for an interface including a search query from a requesting system, generating a set of search results responsive to the search query via a search engine, determining a category associated with the search query, selecting a set of initial content campaigns from a database based on a category associated with the search query and a category associated with each content campaign in the database, selecting a set of candidate content campaigns from the set of initial content campaigns based on a similarity score generated for the search query and each content campaign in the set of initial content campaigns, selecting a set of final content campaigns from the set of candidate content campaigns based on a combined content score comprising a weighted combination of an exploration content score and an exploitation content score, generating an interface including at least one content element selected from the content elements associated with a content campaign in the set of final content campaigns and at least one content element selected from the set of search results, and transmitting the interface to the requesting system. The requesting system is configured to display the interface on a display associated with the requesting system.

In various embodiments, a non-transitory computer-readable medium having instructions stored thereon is disclosed. The instructions, when executed by a processor, cause a device to perform operations including receiving a request for an interface including a search query from a requesting system, generating a set of search results responsive to the search query via a search engine, determining a category associated with the search query, selecting a set of initial content campaigns from a database based on a category associated with the search query and a category associated with each content campaign in the database, selecting a set of candidate content campaigns from the set of initial content campaigns based on a similarity score generated for the search query and each content campaign in the set of initial content campaigns, selecting a set of final content campaigns from the set of candidate content campaigns based on a combined content score comprising a weighted combination of an exploration content score and an exploitation content score, generating an interface including at least one content element selected from the content elements associated with a content campaign in the set of final content campaigns and at least one content element selected from the set of search results, and transmitting the interface to the requesting system. The requesting system is configured to display the interface on a display associated with the requesting system.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
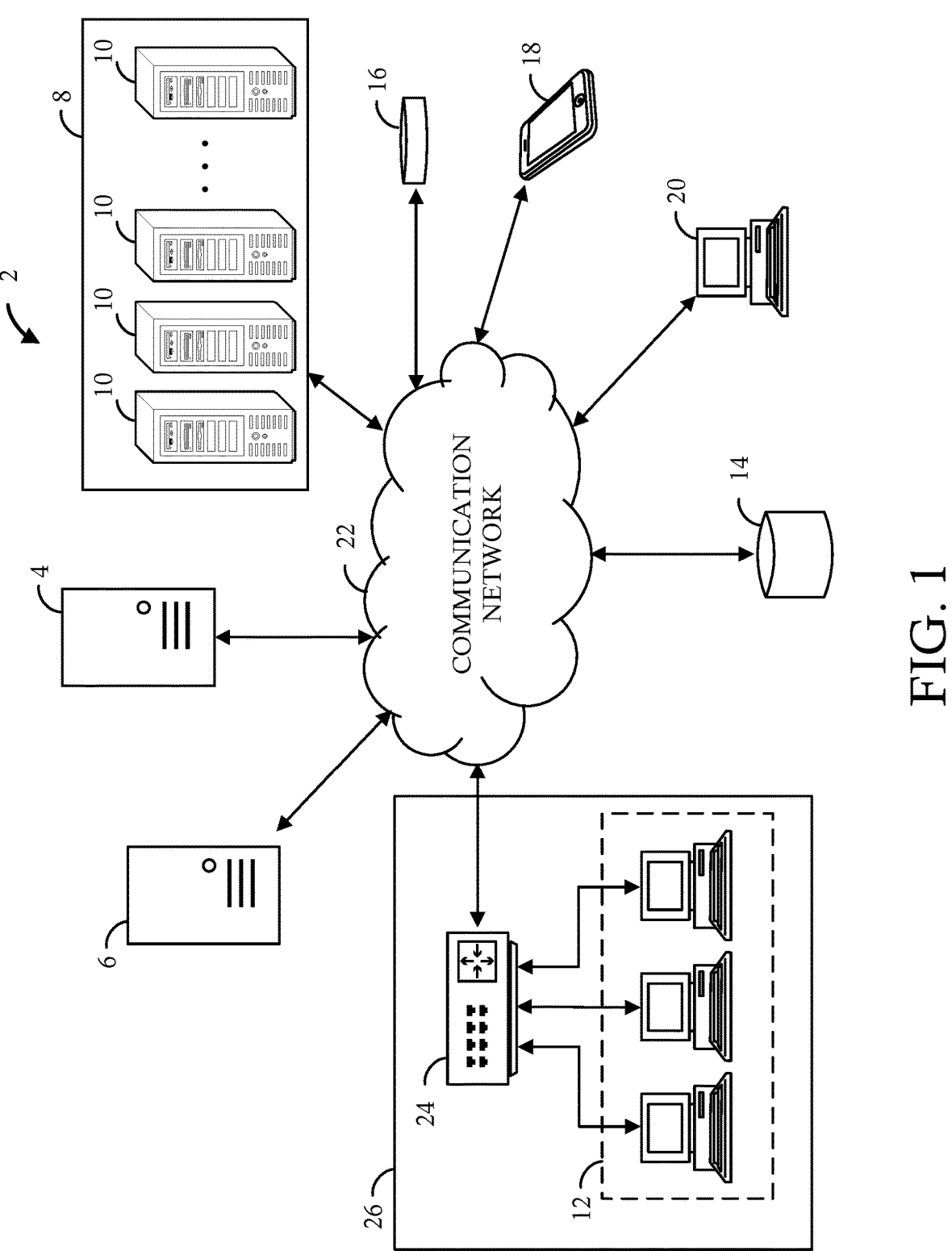
FIG. 1 illustrates a network environment configured to generate a network interface including content elements selected using explore and exploit mechanisms, in accordance with some embodiments.

This description of the exemplary embodiments is intended to be read in connection with the accompanying drawings, which are to be considered part of the entire written description. The drawing figures are not necessarily to scale and certain features of the invention may be shown exaggerated in scale or in somewhat schematic form in the interest of clarity and conciseness. Terms concerning data connections, coupling and the like, such as "connected" and "interconnected," and/or "in signal communication with" refer to a relationship wherein systems or elements are electrically and/or wirelessly connected to one another either directly or indirectly through intervening systems, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein can be assigned to the other claimed objects and vice versa. In other words, claims for the systems can be improved with features described or claimed in the context of the methods. In this case, the functional features of the method are embodied by objective units of the systems. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

Furthermore, in the following, various embodiments are described with respect to methods and systems for generating an improved user interface including content elements selected using explore and exploit mechanisms. In various embodiments, a request for an interface including a search query is received. The search query is provided to a search engine and a content amplification engine. The search engine is configured to generate search results in response to the search query utilizing one or more known search processes, models, etc. The content amplification engine is configured to generate a set of content elements for inclusion in a predetermined portion of the generated interface. In some embodiments, the content amplification engine includes a category retrieval module, a similarity module, a content scoring module, and a ranking module.

In some embodiments, systems, and methods for generating an improved user interface including content elements selected using explore and exploit mechanisms includes training, implementation, and/or re-training of one or more trained similarity models, exploration models, exploitation models, and/or ranking models. The trained similarity models can include one or more models, such as a trained vector similarity model configured to compare two or more embeddings and select content elements based on a similarity score. The trained exploration models can include one or models, such as a trained XGBoost model and the trained exploitation models can include one or more models, such as a trained Thompson sampling model, as discussed in greater detail below. The trained ranking models can include any suitable ranking model and/or process.

In general, a trained function mimics cognitive functions that humans associate with other human minds. In particular, by training based on training data the trained function is able to adapt to new circumstances and to detect and extrapolate patterns.

In general, parameters of a trained function can be adapted by means of training. In particular, a combination of supervised training, semi-supervised training, unsupervised training, reinforcement learning and/or active learning can be used. Furthermore, representation learning (e.g., "feature learning") can be used. In particular, the parameters of the trained functions can be adapted iteratively by several steps of training.

In particular, a trained function can comprise a neural network, a support vector machine, a decision tree a Bayesian network, a clustering network, Qlearning, genetic algorithms and/or association rules, and/or any other suitable function. In particular, a neural network can be a deep neural network, a convolutional neural network, or a convolutional deep neural network. Furthermore, a neural network can be an adversarial network, a deep adversarial network and/or a generative adversarial network.

In various embodiments, neural networks which are trained (e.g., configured or adapted) to generate content element selections for inclusion in a generated interface, are disclosed. A neural network trained to generate content element selected for inclusion in a generated interface may be referred to as a trained content selection model. A trained content selection model may be configured to receive a set of input data, select a set of content elements for inclusion in a generated interface, and provide the selected content elements to an interface generation engine. A trained content selection model may include one or more trained sub-models integrated into a single machine learning framework. For example, as discussed in greater detail below, a content selection model may include, without limitation, one or more similarity models, content scoring models, exploration models, exploitation models, and/or ranking models.

FIG. 1 illustrates a network environment 2 configured to generate an improved network interface including content elements selected using explore and exploit mechanisms, in accordance with some embodiments. The network environment 2 includes a plurality of devices or systems configured to communicate over one or more network channels, illustrated as a network cloud 22. For example, in various embodiments, the network environment 2 can include, but is not limited to, a content selection computing device 4, a web server 6, a cloud-based engine 8 including one or more processing devices 10, workstation(s) 12, a database 14, and/or one or more user computing devices 16, 18, 20 operatively coupled over the network 22. The content selection computing device 4, the web server 6, the processing device(s) 10, the workstation(s) 12, and the user computing devices 16, 18, 20 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over the communication network 22.

In some embodiments, each of the content selection computing device 4 and the processing device(s) 10 can be a computer, a workstation, a laptop, a server such as a cloud-based server, or any other suitable device. In some embodiments, each of the processing devices 10 is a server that includes one or more processing units, such as one or more graphical processing units (GPUs), one or more central processing units (CPUs), and/or one or more processing cores. Each processing device 10 may, in some embodiments, execute one or more virtual machines. In some embodiments, processing resources (e.g., capabilities) of the one or more processing devices 10 are offered as a cloud-based service (e.g., cloud computing). For example, the cloud-based engine 8 may offer computing and storage resources of the one or more processing devices 10 to the content selection computing device 4.

In some embodiments, each of the user computing devices 16, 18, 20 can be a cellular phone, a smart phone, a tablet, a personal assistant device, a voice assistant device, a digital assistant, a laptop, a computer, or any other suitable device. In some embodiments, the web server 6 hosts one or more network environments, such as an e-commerce network environment. In some embodiments, the content selection computing device 4, the processing devices 10, and/or the web server 6 are operated by the network environment provider, and the user computing devices 16, 18, 20 are operated by user of the network environment. In some embodiments, the processing devices 10 are operated by a third party (e.g., a cloud-computing provider).

The workstation(s) 12 are operably coupled to the communication network 22 via a router (or switch) 24. The workstation(s) 12 and/or the router 24 may be located at a physical location 26 remote from the content selection computing device 4, for example. The workstation(s) 12 can communicate with the content selection computing device 4 over the communication network 22. The workstation(s) 12 may send data to, and receive data from, the content selection computing device 4. For example, the workstation(s) 12 may transmit data related to tracked operations performed at the physical location 26 to content selection computing device 4.

Although FIG. 1 illustrates three user computing devices 16, 18, 20, the network environment 2 can include any number of user computing devices 16, 18, 20. Similarly, the network environment 2 can include any number of the content selection computing device 4, the web server 6, the processing devices 10, the workstation(s) 12, and/or the databases 14. It will further be appreciated that additional systems, servers, storage mechanism, etc. can be included within the network environment 2. In addition, although embodiments are illustrated herein having individual, discrete systems, it will be appreciated that, in some embodiments, one or more systems can be combined into a single logical and/or physical system. For example, in various embodiments, one or more of the content selection computing device 4, the web server 6, the workstation(s) 12, the database 14, the user computing devices 16, 18, 20, and/or the router 24 can be combined into a single logical and/or physical system. Similarly, although embodiments are illustrated having a single instance of each device or system, it will be appreciated that additional instances of a device can be implemented within the network environment 2. In some embodiments, two or more systems can be operated on shared hardware in which each system operates as a separate, discrete system utilizing the shared hardware, for example, according to one or more virtualization schemes.

The communication network 22 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 22 can provide access to, for example, the Internet.

Each of the first user computing device 16, the second user computing device 18, and the Nth user computing device 20 may communicate with the web server 6 over the communication network 22. For example, each of the user computing devices 16, 18, 20 may be operable to view, access, and interact with a website, such as an e-commerce website, hosted by the web server 6. The web server 6 may transmit user session data related to a user's activity (e.g., interactions) on the website. For example, a user may operate one of the user computing devices 16, 18, 20 to initiate a web browser that is directed to the website hosted by the web server 6. The user computing device 16, 18, 20 may, via the web browser, perform various operations such as searching one or more databases or catalogs associated with the displayed website, view item data for elements associated with and displayed on the website, and click on interface elements presented via the website, for example, in the search results. The website may capture these activities as user session data, and transmit the user session data to the content selection computing device 4 over the communication network 22. The website may also facilitate the user computing device 16, 18, 20 to allow interactions with one or more of interface elements to perform specific operations, such as selecting one or more items for further processing. In some embodiments, the web server 6 transmits user interaction data identifying interactions between a corresponding user computing device 16, 18, 20 and the website to the content selection computing device 4.

In some embodiments, the content selection computing device 4 may execute one or more models, processes, or algorithms, such as a machine learning model, deep learning model, statistical model, etc., to identify content elements for inclusion in a first portion of the generated interface. The content selection computing device 4 may transmit one or more selected content elements, to the web server 6 over the communication network 22, and the web server 6 may display interface elements associated with the one or more selected content elements in conjunction with one or more programmatic interface elements on the website to the user.

For example, the web server 6 may display interface elements associated with selected content to the user on a homepage, a catalog webpage, an item webpage, a window or interface of a chatbot, a search results webpage, or a post-transaction webpage of the website (e.g., as the user browses those respective webpages).

In some embodiments, the web server 6 transmits a search request and/or a content request to the content selection computing device 4. The search request may be a textual, image-based, and/or other input based search request. The content selection computing device 4 is configured to implement one or more engines and/or modules, such as a search engine and/or a content amplification engine, to identify interface elements for inclusion in a first portion of a generated interface. The content selection computing device 4, via the implemented engines and/or modules, is configured to receive the search query and select a set of content elements configured to provide a predetermined balance between exploitation of the highest-relevance content elements and exploration of other relevant content elements. In some embodiments, the content selection computing device 4 is configured to receive the search request, implement a category module configured to obtain a set of predefined content elements, implement a similarity module configured to generate a set of candidate content elements from the set of predefined content elements, implement a content scoring module configured to generate a content score utilizing explore/exploit processes, and implement a ranking module to select a set of final content elements based on a content score for each content element in the set of candidate content elements. The content scoring module can be configured to implement at least one exploration model and at least one exploitation model to generate a content score.

In some embodiments, the content selection computing device 4 is configured to generate a set of search results responsive to the search query. The content selection computing device 4 may implement one or more known search engines, search models, search processes, etc. to generate a set of search results relevant to a search query and/or user context. In some embodiments, the content selection computing device 4 is configured to generate one or more inputs utilized by content exploration, exploitation, and/or amplification processes, such as, for example, one or more category selections, one or more generated embeddings, one or more search scores, etc.

In some embodiments, a user computing device 16, 18, 20 submits a query via a website hosted by the web server 6. The web server 6 may send a search and/or content request to the content selection computing device 4. In response to receiving the search/content request, the content selection computing device 4 may execute one or more processes to determine interface elements for inclusion in at least one portion of a generated interface and transmit the results including selected interface elements and associated programmatic operations to the web server 6 to be displayed to the user. For example, in some embodiments, the web server 6 includes an interface generation engine configured to generate a customized network interface and provide the customized network interface, and/or instructions for generating the customized network interface, to a user computing device 16, 18, 20, which displays the user interface via one or more display elements. The customized network interface can include any suitable network interface, such as, for example, an e-commerce interface, a service interface, an intranet interface, and/or any other suitable user interface. In some embodiments, the customized interface includes a webpage, web portal, intranet page, application page, and/or other interactive interface. The customized network interface includes a set of content elements selected, at least in part, by a content amplification engine.

The content selection computing device 4 is further operable to communicate with the database 14 over the communication network 22. For example, the content selection computing device 4 can store data to, and read data from, the database 14. The database 14 can be a remote storage device, such as a cloud-based server, a disk (e.g., a hard disk), a memory device on another application server, a networked computer, or any other suitable remote storage. Although shown remote to the content selection computing device 4, in some embodiments, the database 14 can be a local storage device, such as a hard drive, a non-volatile memory, or a USB stick. The content selection computing device 4 may store interaction data received from the web server 6 in the database 14. The content selection computing device 4 may also receive from the web server 6 user session data identifying events associated with browsing sessions, and may store the user session data in the database 14.

In some embodiments, the content selection computing device 4 generates training data for a plurality of models (e.g., machine learning models, deep learning models, statistical models, algorithms, etc.) based on aggregation data, variant-level data, holiday and event data, recall data, historical user session data, current user session data, search data, purchase data, catalog data, etc. The content selection computing device 4 and/or one or more of the processing devices 10 may train one or more models based on corresponding training data. The content selection computing device 4 can store the models in a database, such as in the database 14 (e.g., a cloud storage database).

The models, when executed by the content selection computing device 4, allow the content selection computing device 4 to select interface elements automatically and programmatically for inclusion in an interface. The selected interface elements provide a selected balance between exploration of the highest-relevance content elements and exploitation of other relevant or potentially relevant content elements. For example, the content selection computing device 4 may obtain one or more models from the database 14. The content selection computing device 4 may then receive, in real-time from the web server 6, a search/content request. In response to receiving the search/content request, the content selection computing device 4 may execute one or more models to select a set of interface elements to be included in a first portion of an interface and/or a set of search results to be included in a second portion of an interface.

In some embodiments, the content selection computing device 4 assigns the models (or parts thereof) for execution to one or more processing devices 10. For example, each model may be assigned to a virtual machine hosted by a processing device 10. The virtual machine may cause the models or parts thereof to execute on one or more processing units such as GPUs. In some embodiments, the virtual machines assign each model (or part thereof) among a plurality of processing units. Based on the output of the models, the content selection computing device 4 may generate a set of interface elements for inclusion in a user interface presented to a user computing device 16, 18, 20, for example, via the web server 6.

Figure 2:
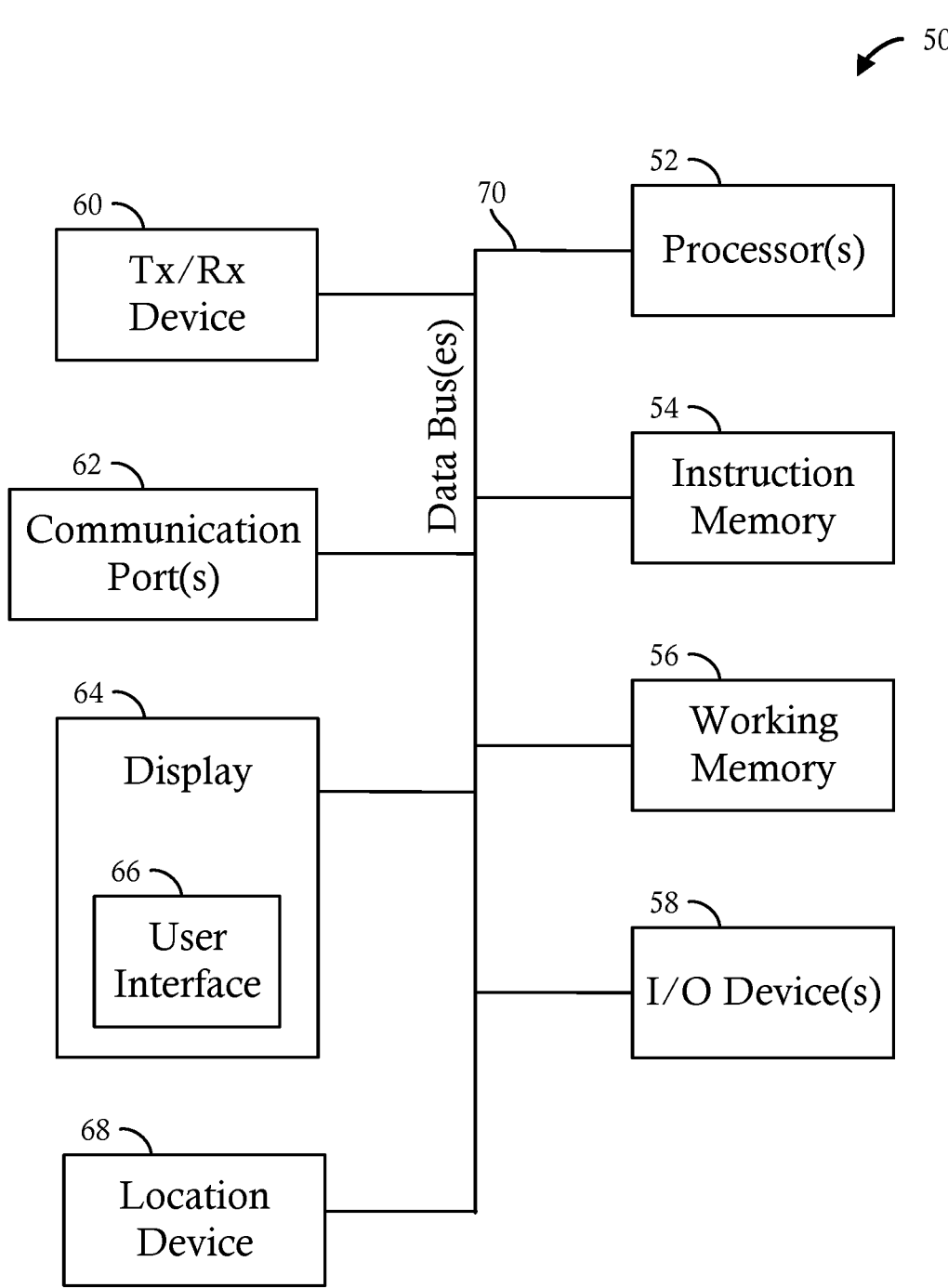
FIG. 2 illustrates a computer system configured to implement one or more processes, in accordance with some embodiments.

FIG. 2 illustrates a block diagram of a computing device 50, in accordance with some embodiments. In some embodiments, each of the content selection computing device 4, the web server 6, the one or more processing devices 10, the workstation(s) 12, and/or the user computing devices 16, 18, 20 in FIG. 1 may include the features shown in FIG. 2. Although FIG. 2 is described with respect to certain components shown therein, it will be appreciated that the elements of the computing device 50 can be combined, omitted, and/or replicated. In addition, it will be appreciated that additional elements other than those illustrated in FIG. 2 can be added to the computing device.

As shown in FIG. 2, the computing device 50 can include one or more processors 52, an instruction memory 54, a working memory 56, one or more input/output devices 58, a transceiver 60, one or more communication ports 62, a display 64 with a user interface 66, and an optional location device 68, all operatively coupled to one or more data buses 70. The data buses 70 allow for communication among the various components. The data buses 70 can include wired, or wireless, communication channels.

The one or more processors 52 can include any processing circuitry operable to control operations of the computing device 50. In some embodiments, the one or more processors 52 include one or more distinct processors, each having one or more cores (e.g., processing circuits). Each of the distinct processors can have the same or different structure. The one or more processors 52 can include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processors 52 may also be implemented by a controller, a microcontroller, an application specific integrated circuit (ASIC), a field programmable gate array (FPGA), a programmable logic device (PLD), etc.

In some embodiments, the one or more processors 52 are configured to implement an operating system (OS) and/or various applications. Examples of an OS include, for example, operating systems generally known under various trade names such as Apple macOS™. Microsoft Windows™, Android™, Linux™, and/or any other proprietary or open-source OS. Examples of applications include, for example, network applications, local applications, data input/output applications, user interaction applications, etc.

The instruction memory 54 can store instructions that can be accessed (e.g., read) and executed by at least one of the one or more processors 52. For example, the instruction memory 54 can be a non-transitory, computer-readable storage medium such as a read-only memory (ROM), an electrically erasable programmable read-only memory (EEPROM), flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processors 52 can be configured to perform a certain function or operation by executing code, stored on the instruction memory 54, embodying the function or operation. For example, the one or more processors 52 can be configured to execute code stored in the instruction memory 54 to perform one or more of any function, method, or operation disclosed herein.

Additionally, the one or more processors 52 can store data to, and read data from, the working memory 56. For example, the one or more processors 52 can store a working set of instructions to the working memory 56, such as instructions loaded from the instruction memory 54. The one or more processors 52 can also use the working memory 56 to store dynamic data created during one or more operations. The working memory 56 can include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 54 and working memory 56, it will be appreciated that the computing device 50 can include a single memory unit configured to operate as both instruction memory and working memory. Further, although embodiments are discussed herein including non-volatile memory, it will be appreciated that computing device 50 can include volatile memory components in addition to at least one non-volatile memory component.

In some embodiments, the instruction memory 54 and/or the working memory 56 includes an instruction set, in the form of a file for executing various methods, such as methods for generating user interfaces including amplified content, as described herein. The instruction set can be stored in any acceptable form of machine-readable instructions, including source code or various appropriate programming languages. Some examples of programming languages that can be used to store the instruction set include, but are not limited to: Java, JavaScript, C, C++, C#, Python, Objective-C, Visual Basic, .NET, HTML, CSS, SQL, NoSQL, Rust, Perl, etc. In some embodiments a compiler or interpreter is configured to convert the instruction set into machine executable code for execution by the one or more processors 52.

The input-output devices 58 can include any suitable device that allows for data input or output. For example, the input-output devices 58 can include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 60 and/or the communication port(s) 62 allow for communication with a network, such as the communication network 22 of FIG. 1. For example, if the communication network 22 of FIG. 1 is a cellular network, the transceiver 60 is configured to allow communications with the cellular network. In some embodiments, the transceiver 60 is selected based on the type of the communication network 22 the computing device 50 will be operating in. The one or more processors 52 are operable to receive data from, or send data to, a network, such as the communication network 22 of FIG. 1, via the transceiver 60.

The communication port(s) 62 may include any suitable hardware, software, and/or combination of hardware and software that is capable of coupling the computing device 50 to one or more networks and/or additional devices. The communication port(s) 62 can be arranged to operate with any suitable technique for controlling information signals using a desired set of communications protocols, services, or operating procedures. The communication port(s) 62 can include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 62 allows for the programming of executable instructions in the instruction memory 54. In some embodiments, the communication port(s) 62 allow for the transfer (e.g., uploading or downloading) of data, such as machine learning model training data.

In some embodiments, the communication port(s) 62 are configured to couple the computing device 50 to a network. The network can include local area networks (LAN) as well as wide area networks (WAN) including without limitation Internet, wired channels, wireless channels, communication devices including telephones, computers, wire, radio, optical and/or other electromagnetic channels, and combinations thereof, including other devices and/or components capable of/associated with communicating data. For example, the communication environments can include in-body communications, various devices, and various modes of communications such as wireless communications, wired communications, and combinations of the same.

In some embodiments, the transceiver 60 and/or the communication port(s) 62 are configured to utilize one or more communication protocols. Examples of wired protocols can include, but are not limited to, Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols can include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1×RTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 64 can be any suitable display, and may display the user interface 66. The user interfaces 66 can enable user interaction with the content selection computing device 4. For example, the user interface 66 can be a user interface for an application of a network environment operator that allows a user to view and interact with the operator's website. In some embodiments, a user can interact with the user interface 66 by engaging the input-output devices 58. In some embodiments, the display 64 can be a touchscreen, where the user interface 66 is displayed on the touchscreen.

The display 64 can include a screen such as, for example, a Liquid Crystal Display (LCD) screen, a light-emitting diode (LED) screen, an organic LED (OLED) screen, a movable display, a projection, etc. In some embodiments, the display 64 can include a coder/decoder, also known as Codecs, to convert digital media data into analog signals. For example, the visual peripheral output device can include video Codecs, audio Codecs, or any other suitable type of Codec.

The optional location device 68 may be communicatively coupled to the a location network and operable to receive position data from the location network. For example, in some embodiments, the location device 68 includes a GPS device configured to receive position data identifying a latitude and longitude from one or more satellites of a GPS constellation. As another example, in some embodiments, the location device 68 is a cellular device configured to receive location data from one or more localized cellular towers. Based on the position data, the computing device 50 may determine a local geographical area (e.g., town, city, state, etc.) of its position.

In some embodiments, the computing device 50 is configured to implement one or more modules or engines, each of which is constructed, programmed, configured, or otherwise adapted, to autonomously carry out a function or set of functions. A module/engine can include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine can also be implemented as a combination of the two, with certain functions facilitated by hardware alone, and other functions facilitated by a combination of hardware and software. In certain implementations, at least a portion, and in some cases, all, of a module/engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine can be realized in a variety of physically realizable configurations, and should generally not be limited to any particular implementation exemplified herein, unless such limitations are expressly called out. In addition, a module/engine can itself be composed of more than one sub-modules or sub-engines, each of which can be regarded as a module/engine in its own right. Moreover, in the embodiments described herein, each of the various modules/engines corresponds to a defined autonomous functionality; however, it should be understood that in other contemplated embodiments, each functionality can be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

Figure 3:
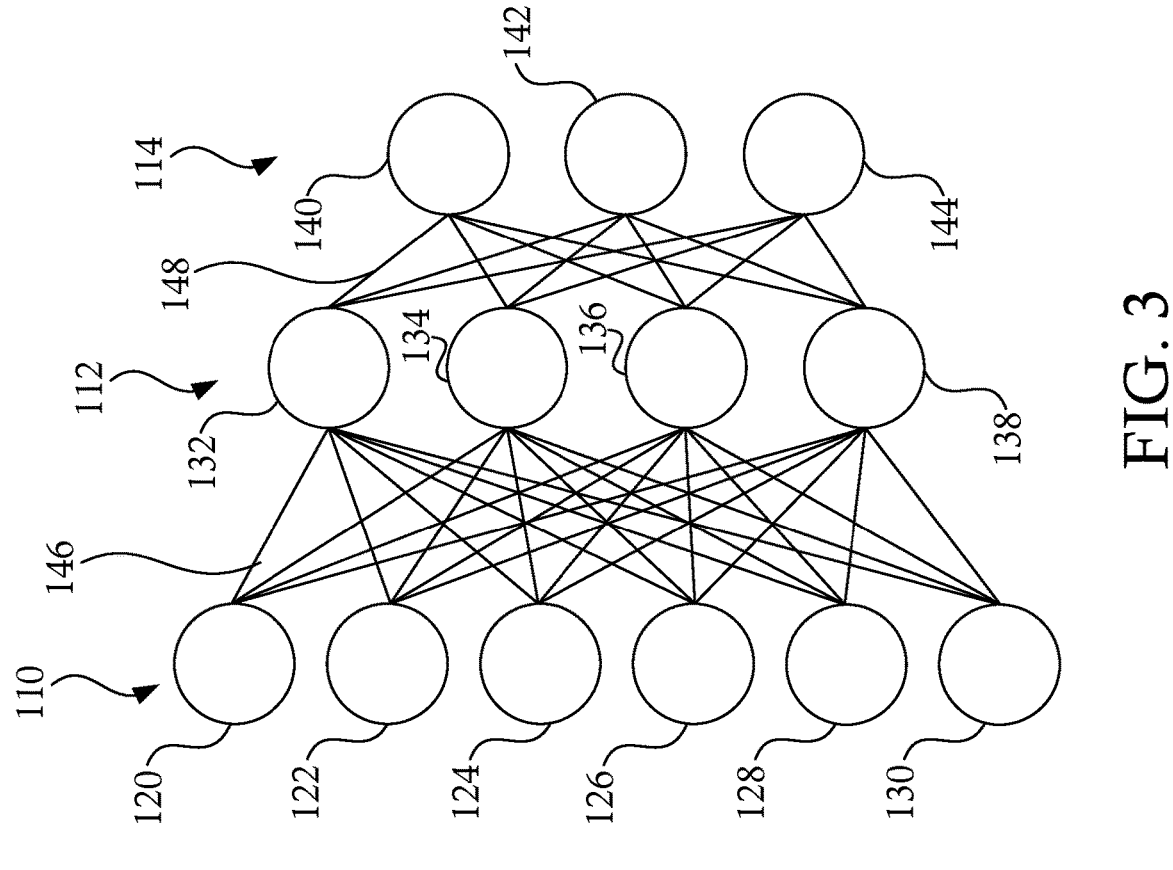
FIG. 3 illustrates an artificial neural network, in accordance with some embodiments.

FIG. 3 illustrates an artificial neural network 100, in accordance with some embodiments. Alternative terms for "artificial neural network" are "neural network," "artificial neural net," "neural net," or "trained function." The neural network 100 comprises nodes 120-144 and edges 146-148, wherein each edge 146-148 is a directed connection from a first node 120-138 to a second node 132-144. In general, the first node 120-138 and the second node 132-144 are different nodes, although it is also possible that the first node 120-138 and the second node 132-144 are identical. For example, in FIG. 3 the edge 146 is a directed connection from the node 120 to the node 132, and the edge 148 is a directed connection from the node 132 to the node 140. An edge 146-148 from a first node 120-138 to a second node 132-144 is also denoted as "ingoing edge" for the second node 132-144 and as "outgoing edge" for the first node 120-138.

The nodes 120-144 of the neural network 100 can be arranged in layers 110-114, wherein the layers can comprise an intrinsic order introduced by the edges 146-148 between the nodes 120-144. In particular, edges 146-148 can exist only between neighboring layers of nodes. In the illustrated embodiment, there is an input layer 110 comprising only nodes 120-130 without an incoming edge, an output layer 114 comprising only nodes 140-144 without outgoing edges, and a hidden layer 112 in-between the input layer 110 and the output layer 114. In general, the number of hidden layer 112 can be chosen arbitrarily and/or through training. The number of nodes 120-130 within the input layer 110 usually relates to the number of input values of the neural network, and the number of nodes 140-144 within the output layer 114 usually relates to the number of output values of the neural network.

In particular, a (real) number can be assigned as a value to every node 120-144 of the neural network 100. Here, $x_i^{(n)}$ denotes the value of the i-th node 120-144 of the n-th layer 110-114. The values of the nodes 120-130 of the input layer 110 are equivalent to the input values of the neural network 100, the values of the nodes 140-144 of the output layer 114 are equivalent to the output value of the neural network 100. Furthermore, each edge 146-148 can comprise a weight being a real number, in particular, the weight is a real number within the interval $[-1, 1]$, within the interval $[0, 1]$, and/or within any other suitable interval. Here, $$w_{i,j}^{(m,n)}$$

denotes the weight of the edge between the i-th node 120-138 of the m-th layer 110, 112 and the j-th node 132-144 of the n-th layer 112, 114. Furthermore, the abbreviation $$w_{i,j}^{(m,n)}$$

is defined for the weight $$w_{i,j}^{(n,n+1)}.$$

In particular, to calculate the output values of the neural network 100, the input values are propagated through the neural network. In particular, the values of the nodes 132-144 of the (n+1)-th layer 112, 114 can be calculated based on the values of the nodes 120-138 of the n-th layer 110, 112 by $$x_j^{(n+1)} = f\left(\sum_i x_i^{(n)} \cdot w_{i,j}^{(n)}\right)$$

Herein, the function f is a transfer function (another term is "activation function"). Known transfer functions are step functions, sigmoid function (e.g., the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 110 are given by the input of the neural network 100, wherein values of the hidden layer(s) 112 can be calculated based on the values of the input layer 110 of the neural network and/or based on the values of a prior hidden layer, etc.

In order to set the values $$w_{i,j}^{(m,n)}$$

for the edges, the neural network 100 has to be trained using training data. In particular, training data comprises training input data and training output data. For a training step, the neural network 100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 100 (backpropagation algorithm). In particular, the weights are changed according to $$w_{i,j}^{\prime(n)} = w_{i,j}^{(n)} - \gamma \cdot \delta_j^{(n)} \cdot x_i^{(n)}$$

wherein $\gamma$ is a learning rate, and the numbers $$\delta_j^{(n)}$$

can be recursively calculated as $$\delta_j^{(n)} = \left(\sum_k \delta_k^{(n+1)} \cdot w_{j,k}^{(n+1)}\right) \cdot f'\left(\sum_i x_i^{(n)} \cdot w_{i,j}^{(n)}\right)$$

based on $$\delta_j^{(n+1)},$$

if the (n+1)-th layer is not the output layer, and $$\delta_j^{(n)} = \left(x_k^{(n+1)} - t_j^{(n+1)}\right) \cdot f'\left(\sum_i x_i^{(n)} \cdot w_{i,j}^{(n)}\right)$$

if the (n+1)-th layer is the output layer 114, wherein f' is the first derivative of the activation function, and $$y_j^{(n+1)}$$

is the comparison training value for the j-th node of the output layer 114.

Figure 4:
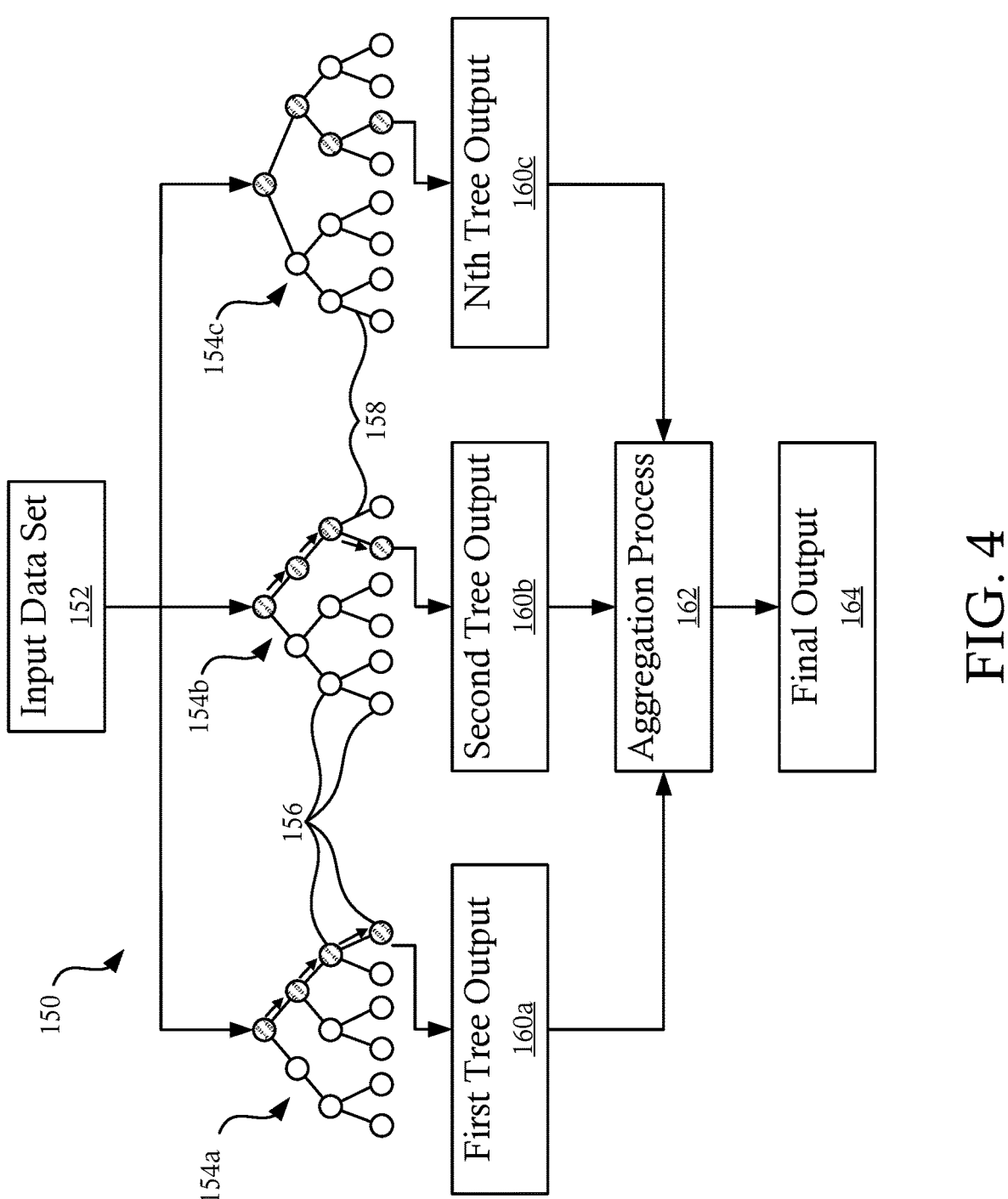
FIG. 4 illustrates a tree-based artificial neural network, in accordance with some embodiments.

FIG. 4 illustrates a tree-based neural network 150, in accordance with some embodiments. In particular, the tree-based neural network 150 is a random forest neural network, though it will be appreciated that the discussion herein is applicable to other decision tree neural networks. The tree-based neural network 150 includes a plurality of trained decision trees 154a-154c each including a set of nodes 156 (also referred to as "leaves") and a set of edges 158 (also referred to as "branches").

Each of the trained decision trees 154a-154c can include a classification and/or a regression tree (CART). Classification trees include a tree model in which a target variable can take a discrete set of values, e.g., can be classified as one of a set of values. In classification trees, each leaf 156 represents class labels and each of the branches 158 represents conjunctions of features that connect the class labels. Regression trees include a tree model in which the target variable can take continuous values (e.g., a real number value).

In operation, an input data set 152 including one or more features or attributes is received. A subset of the input data set 152 is provided to each of the trained decision trees 154a-154c. The subset can include a portion of and/or all of the features or attributes included in the input data set 152. Each of the trained decision trees 154a-154c is trained to receive the subset of the input data set 152 and generate a tree output value 160a-160c, such as a classification or regression output. The individual tree output value 160a-160c is determined by traversing the trained decision trees 154a-154c to arrive at a final leaf (or node) 156.

In some embodiments, the tree-based neural network 150 applies an aggregation process 162 to combine the output of each of the trained decision trees 154a-154c into a final output 164. For example, in embodiments including classification trees, the tree-based neural network 150 can apply a majority-voting process to identify a classification selected by the majority of the trained decision trees 154a-154c. As another example, in embodiments including regression trees, the tree-based neural network 150 can apply an average, mean, and/or other mathematical process to generate a composite output of the trained decision trees. The final output 164 is provided as an output of the tree-based neural network 150.

Figure 5:
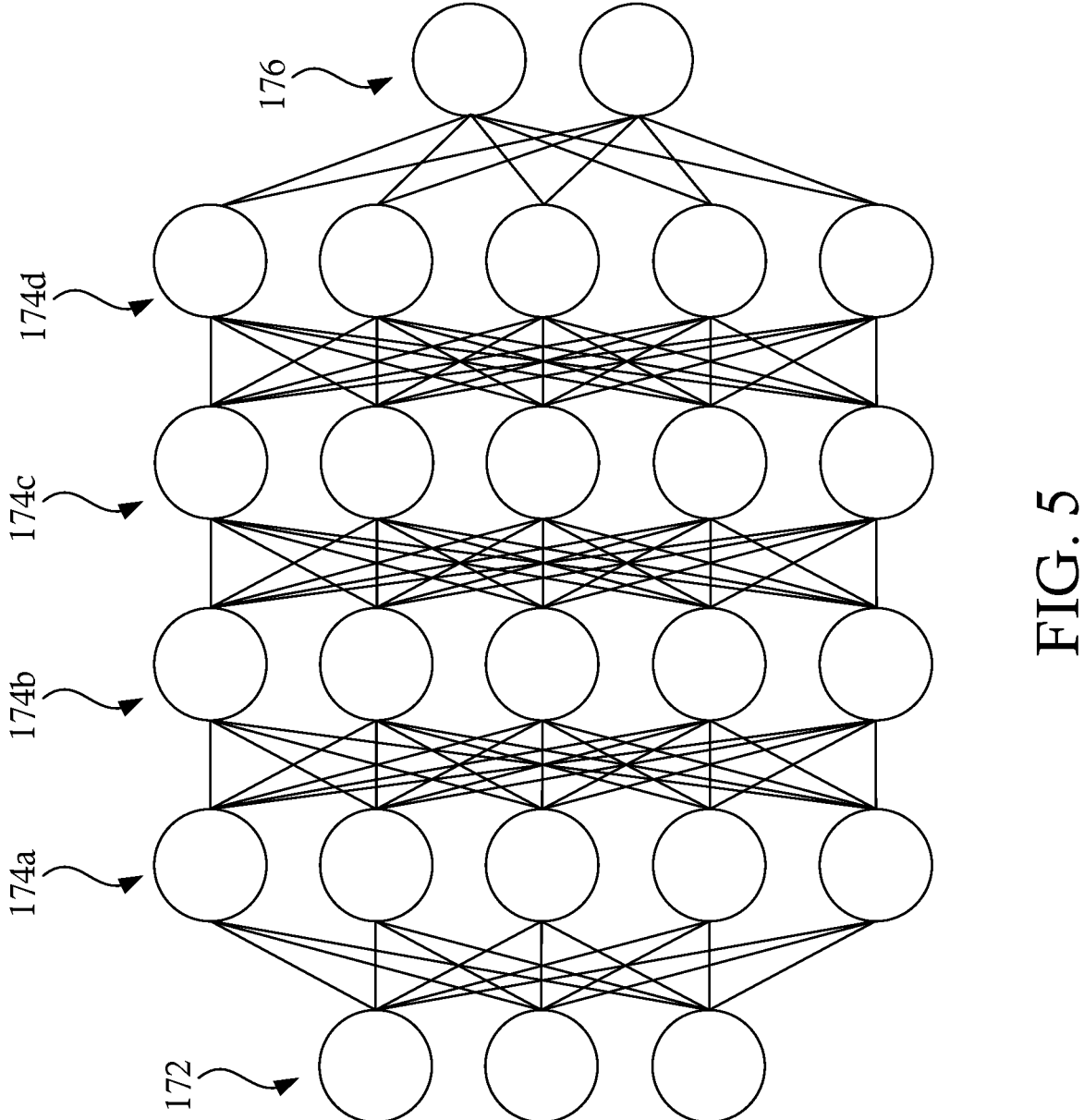
FIG. 5 illustrates a deep neural network (DNN), in accordance with some embodiments.

FIG. 5 illustrates a deep neural network (DNN) 170, in accordance with some embodiments. The DNN 170 is an artificial neural network, such as the neural network 100 illustrated in conjunction with FIG. 3, that includes representation learning. The DNN 170 can include an unbounded number of (e.g., two or more) intermediate layers 174a-174d each of a bounded size (e.g., having a predetermined number of nodes), providing for practical application and optimized implementation of a universal classifier. Each of the layers 174a-174d can be heterogenous. The DNN 170 can is configured to model complex, non-linear relationships. Intermediate layers, such as intermediate layer 174c, can provide compositions of features from lower layers, such as layers 174a, 174b, providing for modeling of complex data.

In some embodiments, the DNN 170 can be considered a stacked neural network including multiple layers each configured to execute one or more computations. The computation for a network with L hidden layers can be denoted as:

$$f(x) = f[a^{(L+1)}(h^{(L)}(a^{(L)}(\ldots(h^{(2)}(a^{(2)}(h^{(1)}(a^{(1)}(x)))))))))]$$

where $a^{(l)}(x)$ is a preactivation function and $h^{(l)}(x)$ is a hidden-layer activation function providing the output of each hidden layer. The preactivation function $a^{(l)}(x)$ can include a linear operation with matrix $W^{(l)}$ and bias $b^{(l)}$ where:

$$a^{(l)}(x) = W^{(l)}x + b^{(l)}$$

In some embodiments, the DNN 170 is a feedforward network in which data flows from an input layer 172 to an output layer 176 without looping back through any layers. In some embodiments, the DNN 170 can include a backpropagation network in which the output of at least one hidden layer is provided, e.g., propagated, to a prior hidden layer. The DNN 170 can include any suitable neural network, such as a self-organizing neural network, a recurrent neural network, a convolutional neural network, a modular neural network, and/or any other suitable neural network.

In some embodiments, a DNN 170 can include a neural additive model (NAM). An NAM includes a linear combination of networks, each of which attends to (e.g., provides a calculation regarding) a single input feature. For example, an NAM can be represented as:

$$y = \beta + f_1(x_1) + f_2(x_2) + \ldots + f_K(x_K)$$

where $\beta$ is an offset and each $f_i$ is parametrized by a neural network. In some embodiments, the DNN 170 can include a neural multiplicative model (NMM), including a multiplicative form for the NAM mode using a log transformation of the dependent variable y and the independent variable x:

$$y = e^{\beta} e^{f(\log x)} e^{\sum_i f_i^d(d_i)}$$

where d represents one or more features of the independent variable x.

Figure 6:
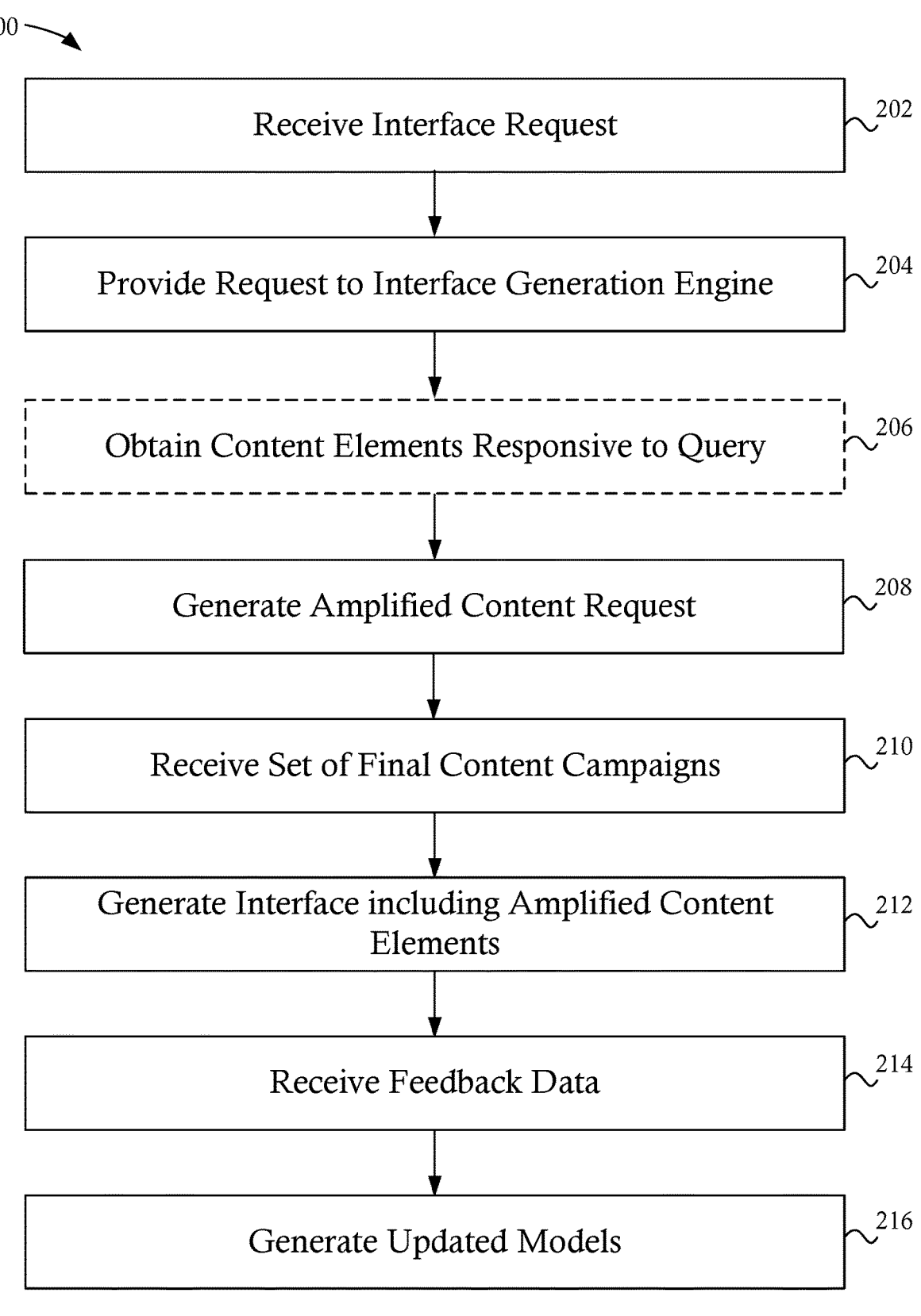
FIG. 6 is a flowchart illustrating an interface generation method, in accordance with some embodiments.
Figure 7:
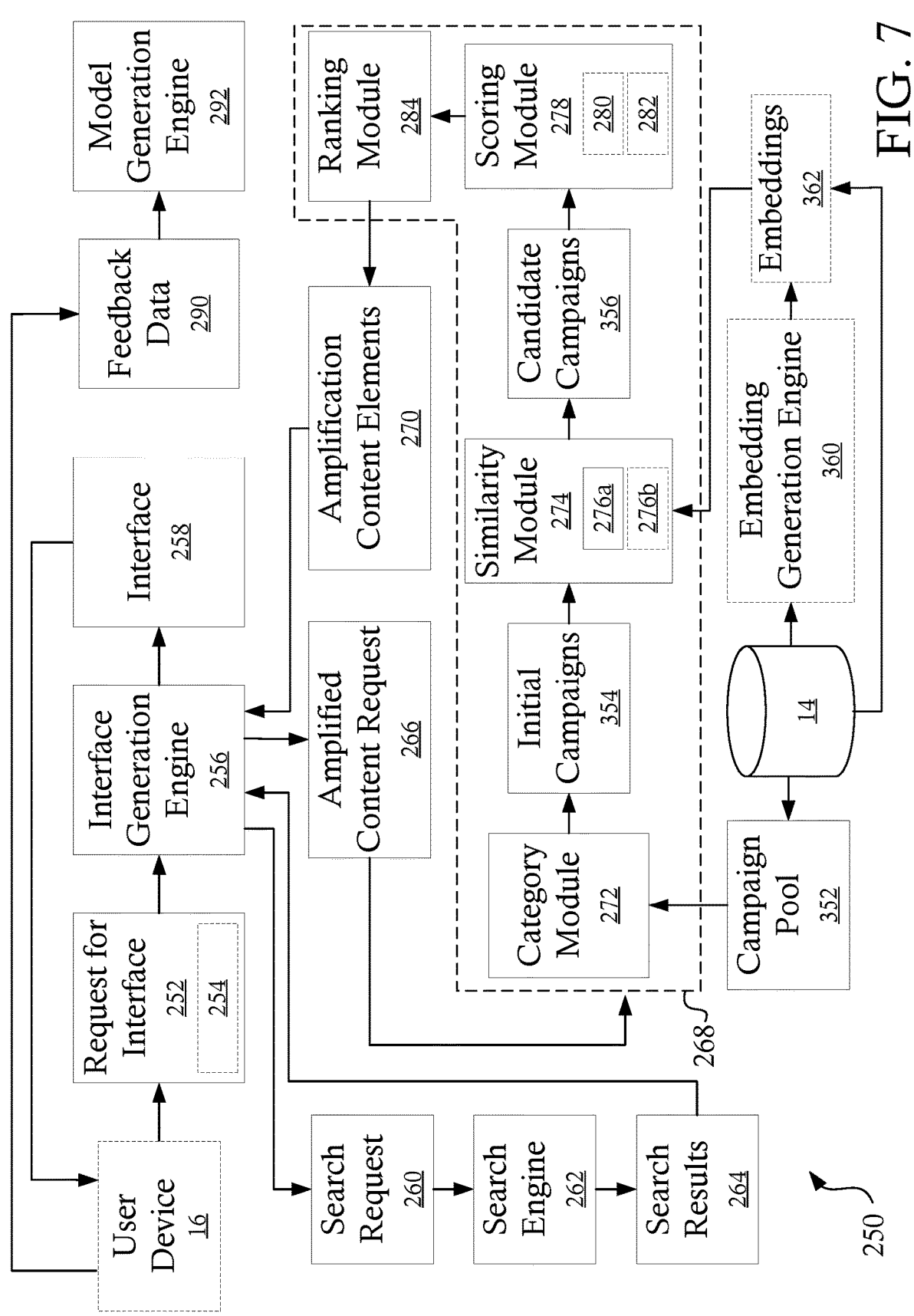
FIG. 7 is a process flow illustrating various steps of the interface generation method of FIG. 6, in accordance with some embodiments.

FIG. 6 is a flowchart illustrating an interface generation method 200, in accordance with some embodiments. FIG. 7 is a process flow 250 illustrating various steps of the interface generation method 200, in accordance with some embodiments. At step 202, an interface request 252 is received. The interface request 252 can be received by any suitable system and/or engine, such as, for example, an interface generation engine 256. In some embodiments, the interface request 252 is generated by a remote system, such as a user computing device 16, 18, 20, although it will be appreciated that an interface request 252 can be generated locally and/or in response to other processes. In some embodiments, the interface request 252 includes user data, such as, for example, a user identifier, context data, session data, and/or any other suitable user data. The user data can be generated by any suitable mechanism, such as, for example, a cookie, beacon, and/or other identifier stored on and/or provided to a user computing device 16, 18, 20.

In some embodiments, the interface request 252 includes a query 254. The query 254 may be generated by a user computing device 16, 18, 20 interacting with one or more interface pages or elements associated with a network interface. For example, in some embodiments, the query 254 can include an alphanumeric input, such as a search string, an item identifier, etc. provided to a search bar or other search component presented within an interface page, such as a search page, home page, etc. of a network interface. An alphanumeric search string may include one or more alphanumeric entries (e.g., words, phrases, numbers, etc.) indicating a scope or target of a search. Similarly, an item identifier may identify one or more anchor items to be used as a basis of a search. As another example, in some embodiments, a query 254 may be provided through one or more interactions with content elements of an interface, such as, for example, selecting a content element that is programmatically generated to request an interface page including search results related to the content element. In the context of an e-commerce network interface, a query 254 may include, but is not limited to, one or more descriptors for identifying items within a product catalog associated with the e-commerce network.

In some embodiments, the interface request 252 includes user signals representative of one or more user session features for a user session corresponding to generation of the interface request 252. User features can include, but are not limited to, user intent features, user journey features, user system features, session data, etc. In some embodiments, user signals can be generated using any suitable mechanism, such as, for example, a cookie, beacon, and/or other data element generated by and/or stored on a user computing device 16, 18, 20. In some embodiments, user signals can be generated by a server or other network interface device, such as a web server 6, based on interactions between a user device and a network interface. The user signals can include, but are not limited to, one or more intent signals representative of a user intent, session journey, etc., one or more historical feature signals representative of prior interactions between users (e.g., the same user and/or different users) with the network interface and/or information provided by the user regarding user preferences, and/or any other suitable signals.

At step 204, the interface request 252 is provided to an interface generation engine 256. The interface generation engine 256 is configured to generate an interface 258 including content elements responsive to the query 254 and/or amplified content elements relevant to the query 254. For example, in some embodiments, the interface generation engine 256 is configured to generate an interface 258 including a first portion having amplified content elements selected using explore/exploit mechanisms and a second portion having search results responsive to the query 254.

In some embodiments, one or more content elements, such as amplified content elements and/or search content elements, are representative of item(s) stored in an item catalog associated with the network platform. For example, in the context of an e-commerce platform, content elements may be representative of items in an item catalog of items sold by the e-commerce platform. The content elements may include image and/or text data representative of the underlying item and can further include programmatically generated elements, such as links, configured to perform one or more functions associated with the e-commerce platform, such as transitioning to an interface page including information regarding the associated item, adding the associated item to a cart, providing additional pop-up or hover information regarding the associated item, and/or otherwise updating an interface based on a user selection of a content element representative of an associated item in an item catalog.

At optional step 206, a set of search results 264 responsive to the query 254 is obtained. For example, in some embodiments, the interface generation engine 256 generates a search request 260, which is provided to a search engine 262. The search engine 262 is configured to generate a set of search results 264 responsive to the query 254 in response to the search request 260. The search engine 262 may be configured to implement any suitable search processes and/or trained models to generate the set of search result 264, such as, for example, one or more trained relevancy models, one or more trained ranking models, and/or any other suitable search models. The set of search results 264 may be provided directly to the interface generation engine 256 for inclusion in a generated interface 258 and/or can undergo additional processing to select a set of search results 264 for presentation to a user via the generated interface 258.

At step 208, a set of amplified content elements 270 is requested. For example, in some embodiments, the interface generation engine 256 generates an amplified content request 266, which is provided to a content amplification engine 268. The content amplification engine 268 is configured to generate a set of amplified content elements 270 responsive to the amplified content request 266. The content amplification engine 268 may include one or more modules and/or trained models configured to obtain a set of potential content elements from a storage mechanism, such as database 14, and select a set of amplified content elements 270 including relevant content elements having a high probability of interaction based on historical interaction data (i.e., content elements selected according to an exploit process) and relevant content elements with little or no historical interaction data (i.e., content elements selected according to an explore process).

Figure 8:
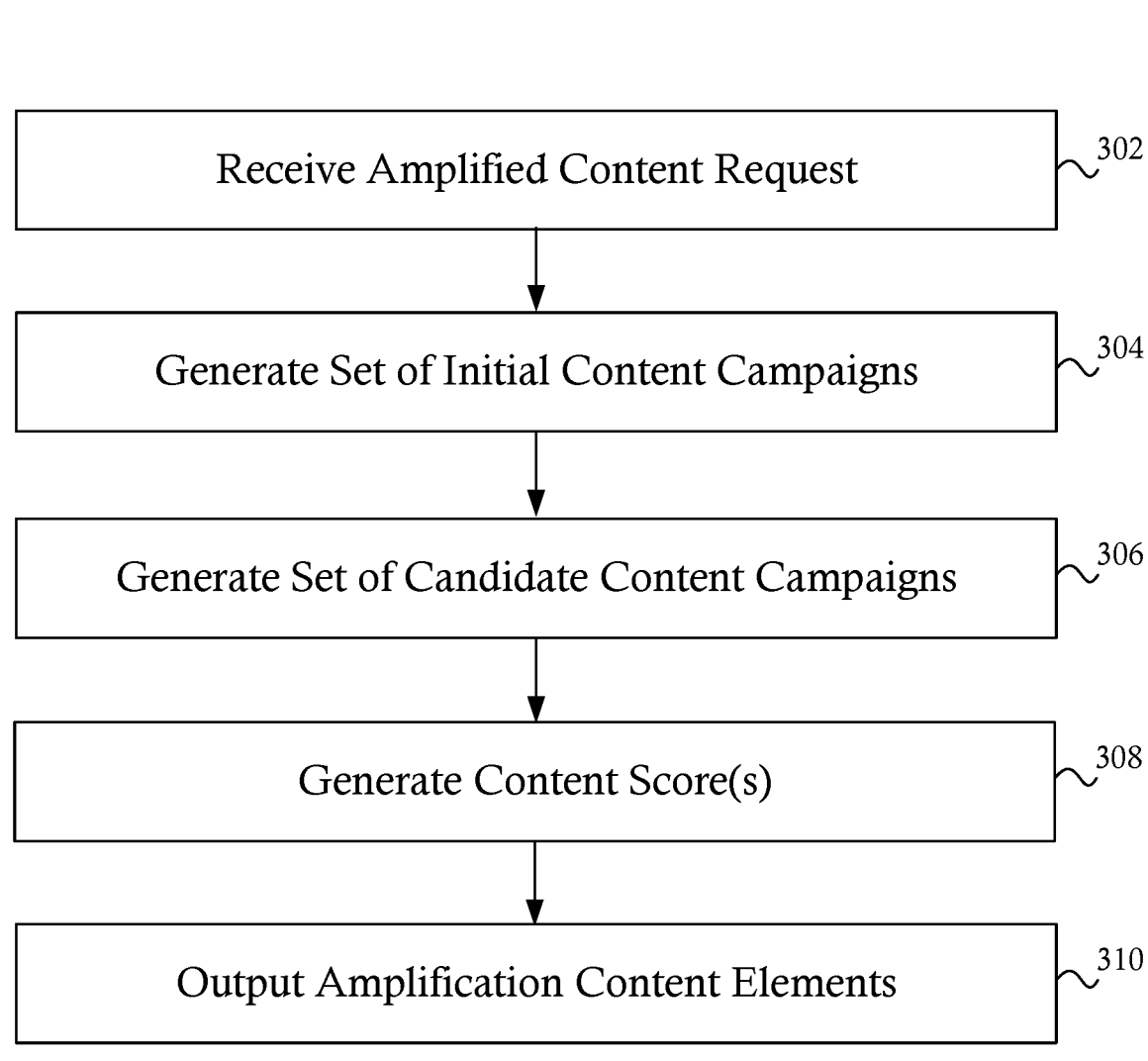
FIG. 8 is a flowchart illustrating a method of selecting a set of final content elements, in accordance with some embodiments.

FIG. 8 is a flowchart illustrating a content selection method 300, in accordance with some embodiments. The content selection method 300 is discussed herein with reference to FIGS. 6-9. At step 302, an amplified content request 266 is received. The amplified content request 266 may be received by any suitable system, engine, and/or process, such as a content amplification engine 268. The amplified content request 266 may be generated by an suitable process, method, or system, such as an interface generation engine 256 as part of an interface generation method 200, although it will be appreciated that other processes and/or methods can request a set of amplified content elements 270 via an amplified content request 266.

In some embodiments, the amplified content request 266 includes one or more data elements extracted from and/or provided as part of an interface request 252. For example, in some embodiments, an amplified content request 266 can include a query 254 extracted from and/or included in an interface request 252. The query 254 may be provided directly from the user computing device 16, 18, 20 that generated the interface request 252 and/or can be provided by an engine and/or process configured to receive the interface request 252, such as an interface generation engine 256. In some embodiments, the amplified content request 266 may include data elements generated by one or more additional processes and/or engines, such as elements generated by a search engine 262, as discussed in further detail below.

At step 304, a set of initial content campaigns 354 is generated. In some embodiments, the set of initial content campaigns 354 is generated based on one or more keywords or categories associated with an amplified content request 266. As used herein, the term "content campaign" refers one or more individual, related content elements grouped for inclusion in a user interface. Example content campaigns include, but are not limited to, seasonal groupings of content elements, brand groupings of content elements, departmental groupings of content elements, third-party defined groupings of content elements, etc. Although embodiments are discussed herein regarding selection and presentation of content campaigns, it will be appreciated that the disclosure is similarly applicable to the selection and presentation of individual content elements, e.g., content campaigns including a single item.

In some embodiments, a content amplification engine 268 is configured to receive an amplified content request 266 including a query 254. The content amplification engine 268 may include a category module 272 configured to extract keywords from the query 254 and select a set of initial content campaigns 354 from a pool of content campaigns 352 based on correspondence between the keywords extracted from the query 254 and keywords associated with each of the content campaigns in the pool of content campaigns 352. The category module 272 may be alternatively and/or additional configured to identify one or more categories associated with the query 254 and/or keywords extracted from the query 254 and select content campaigns from the pool of content campaigns 352 based on a correspondence between the one or more identified categories and categories associated with each content campaign in the pool of content campaigns 352. A category module 272 may implement any suitable method, process, and/or model to identify categories based on a received input, such as a received query 254.

As another example, in some embodiments, data identifying one or more categories associated with an amplified content request 266 may be received from one or more additional processes and/or engines. For example, a query 254 may be provided to a search engine 262 configured to generate a set of search results 264 for inclusion in a generated interface 258. The search engine 262 may be configured to identify one or more categories of content elements associated with the query 254, for example as part of a process for generating the set of search results 264 and/or as a separate implemented process. In some embodiments, the one or more categories identified by the search engine 262 are provided to the content amplification engine 268 as part of the amplified content request 266 and/or as a separate input. The content amplification engine 268 may utilize the one or more categories identified by the search engine 262 to select a set of initial content campaigns 354 from the pool of content campaigns 352. By utilizing a category identification generated by the search engine 262, the content amplification engine avoids duplication of a category identification process, reducing required computing resources and processing time. Although specific embodiments are discussed herein, it will be appreciated that any suitable process can be utilized to identify one or more categories associated with and/or included in an amplified content request 266.

Additional and/or alternative selection criteria may be applied to select a set of initial content campaigns 354. For example, in some embodiments, content campaigns associated with one or more identified categories may be removed from (e.g., filtered from) the set of initial content campaigns 354 based on one or more negative keywords (e.g. exclusion keywords). As another example, in some embodiments, the set of initial content campaigns 354 may be filtered and/or ranked based on one or more parameters associated with the individual content campaigns, such as bid values, promotional associations, seasonal associations, etc. For example, the set of initial content campaigns 354 may be filtered to include only content campaigns having a numeric parameter, such as a bid value, above a predetermined threshold, a predetermined promotional association, a predetermined seasonal association, etc.

At step 306, a set of candidate content campaigns 356 is selected from the set of initial content campaigns 354. In some embodiments, the content amplification engine 268 includes a similarity module 274 configured to generate a similarity score for each content campaign in the set of initial content campaigns 354. The similarity score may include a numerical representation of a similarity, e.g., relevance or match, between a content campaign (and/or the underlying content elements included in the content campaign) and an input, such as a query 254. In some embodiments, the set of candidate content campaigns 356 includes content campaigns having a similarity score equal to and/or greater than a predetermined threshold, e.g., the content amplification engine 268 may be configured to generate a set of candidate content campaigns 356 by selecting content campaigns from the set of initial content campaigns having a similarity score equal to and/or greater than a predetermined threshold similarity score and/or may be configured to remove content campaigns from the set of initial content campaigns when a similarity score is equal to and/or less than a predetermined threshold similarity score.

In some embodiments, the similarity module 274 includes one or more trained models configured to generate a similarity score, such as one or more trained comparison models 276a, 276b (collectively "trained comparison models 276") configured to generate and/or comparison scores for two or more content-related elements. For example, the similarity module 274 may include a first trained comparison model 276a configured to compare a query and a content element and/or a second trained comparison model 276b configured to compare a query taxonomy and a content campaign taxonomy. Although specific embodiments are discussed herein, it will be appreciated that the similarity module 274 may be configured to compare any suitable set of content-related elements (e.g., configured to generate any suitable comparison) to generate a similarity score and/or a sub-portion of a similarity score.

In some embodiments, each of the trained comparison models 276 includes an embedding comparison model configured to utilize an embedding, i.e., a vector representation, of each of the associated content-related elements. For example, in some embodiments, the first trained comparison model 276a is configured to compare a query embedding and a content element embedding to generate a first similarity sub-score. The content elements embeddings may be representative of one or more parameters of a content campaign and/or one or more content elements included in the content campaign, such as a title, a description, one or more variable parameters, etc. When the query 254 is a textual input, the query embedding may be representative of words or keywords included in the query 254. Additionally and/or alternatively, when the query 254 includes an anchor item and/or other item identification, the query embedding may be representative of one or more parameters of the anchor/selected item. The query embedding and/or the content embedding may each include a first predetermined.

As another example, in some embodiments, the second trained comparison model 276b is configured to compare taxonomy embeddings representative of one or more categories associated with each content campaign and taxonomy embeddings representative of one or more categories associated with the query 254. The taxonomy embeddings may be representative of textual descriptions of the categories (e.g., category titles) and/or predefined category features (e.g., category hierarchy, category groupings, etc.). The taxonomy embeddings may include a second predetermined that may be greater than, less than, or equal to the first predetermined length.

In some embodiments, one or more of the trained comparison models 276 is configured to receive pre-generated embeddings 362. For example, in some embodiments, pre-generated embeddings may be generated by an embedding generation engine 360 configured to receive one or more features, such as one or more textual features, and generate a corresponding vector representation. The embedding generation engine 360 may include any suitable framework configured to generate one or more embeddings. For example, in various embodiments, the embedding generation engine 360 may include, but is not limited to, a word embedding framework such as Word2Vec, a character embedding framework such as Char2Vec, a node embedding framework such as Node2Vec, a language model such as a bidirectional encoder representation from transformers (BERT), etc. The embedding generation engine 360 may be configured to provide pre-generated embeddings 362 directly to one or more of the trained comparison models 276 and/or may be configured to store pre-generated embeddings 362 in a storage mechanism, such as database 14, from which the one or more of the trained comparison models 276 may obtain the pre-generated embeddings. In some embodiments, pre-generated embeddings 362 may be generated for each content campaign and/or each content element in a content campaign associated with a network platform, common and/or popular queries, category taxonomies, etc.

In some embodiments, two or more embedding generation engines 360 including any suitable embedding generation framework may be implemented to generate embeddings for corresponding inputs. For example, in some embodiments, a first embedding generation engine 360 is configured to generate content element and/or query embeddings having a first length and a second embedding generation engine (not shown) is configured to generate category taxonomy embeddings have a second predetermined length. The first predetermined length and/or the second predetermined length may be selected during training of the corresponding embedding generation framework.

In some embodiments, the similarity module 274 and/or the one or more the trained comparison models 276 are configured to generate one or more required content embeddings. For example, in some embodiments, a first trained comparison model 276a may be configured to generate a content element embedding representative of one of the initial content campaigns in the set of initial content campaigns 354 and/or a query embedding representative of a query 254. As another example, in some embodiments, a second trained comparison model 276b may be configured to generate category taxonomy embeddings. The similarity module 274 and/or the one or more trained comparison models 276 may be configured to implement any suitable embedding framework, such as, for example, a word embedding framework such as Word2Vec, a character embedding framework such as Char2Vec, etc.

As one non-limiting example, in some embodiments, a first trained comparison model 276a is configured to generate a query embedding from a received query 254 and obtain pre-generated embeddings for each content campaign in the set of initial content campaigns 354 from a database 14. As another non-limiting example, in some embodiments, an embedding generation engine 360 is configured to generate taxonomy embeddings for each category associated with a network platform, such as each category associated with an item catalog, from a database. A second trained comparison model 276b may obtain a taxonomy embedding for a category associated with each of a query 254 and a selected one of the content campaigns in the set of initial content campaigns 354. Although specific embodiments are discussed herein, it will be appreciated that any suitable process can be used to generate embeddings.

In some embodiments, each of the trained comparison models 276 are configured to generate a similarity score based on a comparison of two or more embeddings. For example, in some embodiments, a first trained comparison model 276a is configured to generate a similarity score representative of a similarity of a query embedding and a content embedding for a corresponding content campaign. As another example, in some embodiments, the second trained comparison model 276b is configured to generate a similarity score representative of a similarity of a taxonomy embedding for a query and a taxonomy embedding for a content campaign.

In some embodiments, one or more of the trained comparison models 276 is configured to generate a similarity score by determining a cosine similarity between a first embedding (e.g., query embedding, query category taxonomy embedding, etc.) and a second embedding (e.g., content campaign embedding, content element embedding, content campaign taxonomy embedding, etc.). In some embodiments, the embeddings utilized by a first trained comparison model 276a may include a first predetermined length, such as, for example, 32 dimensions, and the embeddings utilized by a second trained comparison model 276b may include a second predetermined length, such as, for example, 128 dimensions, although it will be appreciated that each of the embeddings may include any suitable dimensions and/or length.

In some embodiments, a final similarity score for each content campaign includes a weighted similarity score, e.g., a weighted combination of two or more similarity subscores. For example, in some embodiments, a similarity module 274 includes a first trained comparison model 276a configured to generate a first similarity score, e.g., a first similarity score representative of a similarity between a query and a content campaign/element, and a second trained comparison model 276b configured to generate a second similarity score, e.g., a second similarity score representative of a similarity between a query category taxonomy and a content campaign category taxonomy. The similarity module 274 may be configured to generate a weighted combination of the first similarity score and the second similarity score. For example, the weighted combination may be generated according to:

$$s_C = (w_1 * s_1) + (w_2 * s_2)$$

where $s_C$ is the final (e.g. weighted) similarity score for a content campaign C, $s_1$ is the first similarity score determined by the first comparison model 276a, $s_2$ is the second similarity score determined by the second comparison model, $w_1$ is a first weight applied to the first similarity score, and $w_2$ is a second weight applied to the second similarity score. The weights $w_1$, $w_2$ may be determined during iterative training of a trained model implemented by the similarity module (e.g., a trained model encompassing the weighted combination and, optionally, one or more of the trained comparison models), may be selected by a separate iterative training process, and/or may be assigned. For example, in one non-limiting embodiment, $w_1=0.75$ and $w_2=0.25$, although it will be appreciated that any suitable values can be utilized and/or determined.

In some embodiments, the set of candidate content campaigns 356 includes content campaigns in the set of initial content campaigns 354 having a weighted similarity score equal to and/or greater than a predetermined threshold, e.g.:

$$s_C = (w_1 * s_1) + (w_2 * s_2) \geq T$$

where T is a predetermined threshold value. As discussed above, it will be appreciated that thresholding can similarly be performed by removing content campaigns having a weighted similarity score equal to and/or below a predetermined threshold, e.g.:

$$s_C = (w_1 * s_1) + (w_2 * s_2) < T$$

At step 308, at least one content score is generated for each content campaign in the set of candidate content campaigns 356. In some embodiments, the content amplification engine 268 includes a content scoring module 278 configured to generate at least one content score for each content campaign in the set of candidate content campaigns 356. The content scoring module 278 may be configured to generate a content score based on any suitable criteria of each content campaign, the search query, and/or additional inputs or features.

In some embodiments, the content score generated for each content campaign is representative of a balance between exploration and exploitation of the underlying content elements included in a content campaign. For example, the content scoring module 278 may include an exploration model 280 configured to generate an exploration content score for each content element including a content campaign and/or an exploitation model 282 configured to generate an exploitation content score for each content element in a content campaign. The exploitation content score represents a likelihood of interaction with the selected content element based on historical interactions, i.e., content elements having a higher exploitation score have a history of interaction with users or searches similar to the current session data and/or query. The exploration score represents a likelihood of interaction for a selected content element without considering (or with less emphasis on) historical interactions, i.e., content elements having a higher exploration score are likely to be relevant based on the session data and/or query even where historical data is not available or shows less interaction with the content element.

In some embodiments, the exploration model includes a trained model framework, such as, for example, a trained random forest framework, a trained gradient boost framework, a trained XGBoost framework, a trained DeepFM framework, etc. The trained exploration model, e.g., a trained XGBoost framework, may be configured to receive any suitable set of input features to generate an exploration score for each content element in a content campaign. For example, in various embodiments, the a trained exploration model may be configured to receive input features including, but not limited to, a content element rating, a content element interaction rate, sales data related to an item represented by a content element, a content element view rate, a content element platform requirement, a content element search match type, pricing data related to the item represented by a content element, title similarity, a taxonomy match score, etc. In some embodiments, a trained exploration model, such as a trained XGBoost model, may be configured to utilize one or more cross features, such as, for example, search cross-features, organic cross-features, catalog cross-features, user session cross-features, etc. In some embodiments, an XGBoost model can be configured to receive user-specific inputs, such as, for example, user session data, user historical data, etc.

In some embodiments, the exploitation model includes a trained model framework, such as, for example, a Thompson Sampling framework, a contextual bandit framework, an upper confidence bound bandit framework, etc. The exploitation model may further include any suitable reward (e.g., payoff) mechanism or framework, such as, for example, linear payoff, logistic payoff, etc. The trained exploitation model, e.g., a Thompson Sampling model, may be configured to receive historical interaction data (e.g., impression data, click data, etc.) and generate a score based on a likelihood of interaction for each content element. The trained exploitation model may apply one or more hyperparameters generated during an iterative training process to generate an exploitation content score. Although specific embodiments are discussed herein, it will be appreciated that any suitable trained models can be configured to generate an exploitation content score and/or an exploration content score.

In some embodiments, the exploitation model is configured to receive user session data, e.g., context data. The exploitation model may be configured to generate an exploitation content score based on user contextual information and/or historical session data for one or more users. Incorporation of user session data allows the exploitation model to generate different scores (e.g., different exploitation content scores, different aggregate scores as discussed below, etc.) for different user contexts/sessions that include the same or similar query.

In some embodiments, the content scoring module 278 is configured to generate a predicted click-through-rate for each content element in a content campaign (e.g., $pCTR_E$). For example, $pCTR_E$ may include a weighted combination of the exploration content score and the exploitation content score:

$$pCTR_E = ExploreScore * w_3 + ExploitScore * w_4$$

where ExploreScore is the exploration content score generated by the exploration model, ExploitScore is the exploitation content score generated by the exploitation model, $w_3$ is a third weight, and $w_4$ is a fourth weight. The weights $w_3$, $w_4$ may be selected during iterative training of a trained model encompassing the trained exploration model and/or trained exploitation model, may be selected by a separate iterative training process, and/or may be assigned.

In some embodiments, the content scoring module 278 is configured to generate a predicted click-through-rate for a content campaign (e.g., $pCTR_C$). $pCTR_C$ may be determined based on the $pCTR_E$ for one or more of the content elements included in a content campaign. For example, in some embodiments, $pCTR_C$ may be generated by aggregating $pCTR_E$ for one or more content elements included in the content campaign, e.g.:

$$pCTR_C = 1 - \prod_{i=1}^{N}(1 - pCTR_{E_i})$$

where n is a predetermined number of content elements for inclusion in the aggregated $pCTR_C$ calculation. In some embodiments, the content elements included in the aggregation include the N content elements having the highest $pCTR_E$ value.

In some embodiments, a combined content score $CS_C$ for each campaign includes a weighted combination of the $pCTR_C$ and one or more additional factors or values. For example, in some embodiments, the content score for each campaign is determined as:

$$CS_C = s_C^{w5} * pCTR_C^{w6} * CPC_C^{w7}$$

where $CPC_C$ is a predetermined cost score (e.g., a cost-per-click value, a bid value, a resource value, a serving cost, etc.), $w_5$ is a fifth weight, $w_6$ is a sixth weight, and $w_7$ is a seventh weight. The weights $w_5$, $w_6$, $w_7$ may be selected during iterative training of a trained model implemented by the content scoring module 278, may be selected by a separate iterative training process, and/or may be assigned. Although specific embodiments are discussed herein, it will be appreciated that a content score $CS_C$ can be determined using additional and/or alternative values.

At step 310, a set of amplified content elements 270 is generated by selecting content elements associated with a set of M highest ranked content campaigns in the set of candidate content campaigns 356 according to at least one content score, where M is a positive integer. In some embodiments, the content amplification engine 268 includes a ranking model 284 configured to receive the set of candidate content campaigns 356 and an associated score, such as the associated content score $CS_C$ from the content scoring module 278, for each content campaign in the set of candidate content campaigns 356. The ranking model 284 may implement any suitable ranking process, such as an algorithmic ranking process and/or a trained machine learning ranking framework, to rank the set of candidate content campaigns 356. After ranking, the M highest-ranked candidate content campaigns (e.g., the set of content elements associated with each of the M highest-ranked candidate content campaigns) is output.

In some embodiments, the amplified content elements 270 are ordered and/or ranked according to one or more criteria. For example, as discussed above, a content scoring module 278 may select a set of N content elements having a highest content element click-through-rate ($pCTR_E$) for inclusion in an aggregated campaign click-through-rate ($pCTR_C$). The content amplification engine 266 may be configured to output the amplification content elements and an associated $pCTR_E$ and/or ranking for each of the amplified content elements 270. The amplified content elements 270 may include all of the content elements associated with a selected content campaign (e.g., one of the M highest-ranked content campaigns in the set of candidate content campaigns 356 according to $pCTR_E$) and/or may include only the N content elements used to generated $pCTR_C$ ranked according to individual $pCTR_E$.

With reference again to FIGS. 6-7, at step 210, the content amplification engine 268 provides the set of amplified content elements 270 to the interface generation engine 256 and, at step 212, the interface generation engine 256 generates an interface 258 including one or more content elements associated with one or more of the content campaigns in the set of final content campaigns 358 ("amplified content elements"). For example, in some embodiments, the interface generation engine 256 is configured to generate an interface 258 including the set of N content elements having the highest $pCTR_E$ value for each content campaign in the set of final content campaigns 358. As another example, in some embodiments, the interface generation engine 256 can be configured to generate an interface 258 including a set of O content elements having the highest $pCTR_E$ value, where O is less than or greater than N, for a set of P content campaigns, where P is less than M. Although specific examples are provided herein, it will be appreciated that any combination of one or more of the content campaigns in the set of final content campaigns 358 and one or more of the content elements associated with the selected content campaign(s) can be included in the interface 258.

Figure 9:
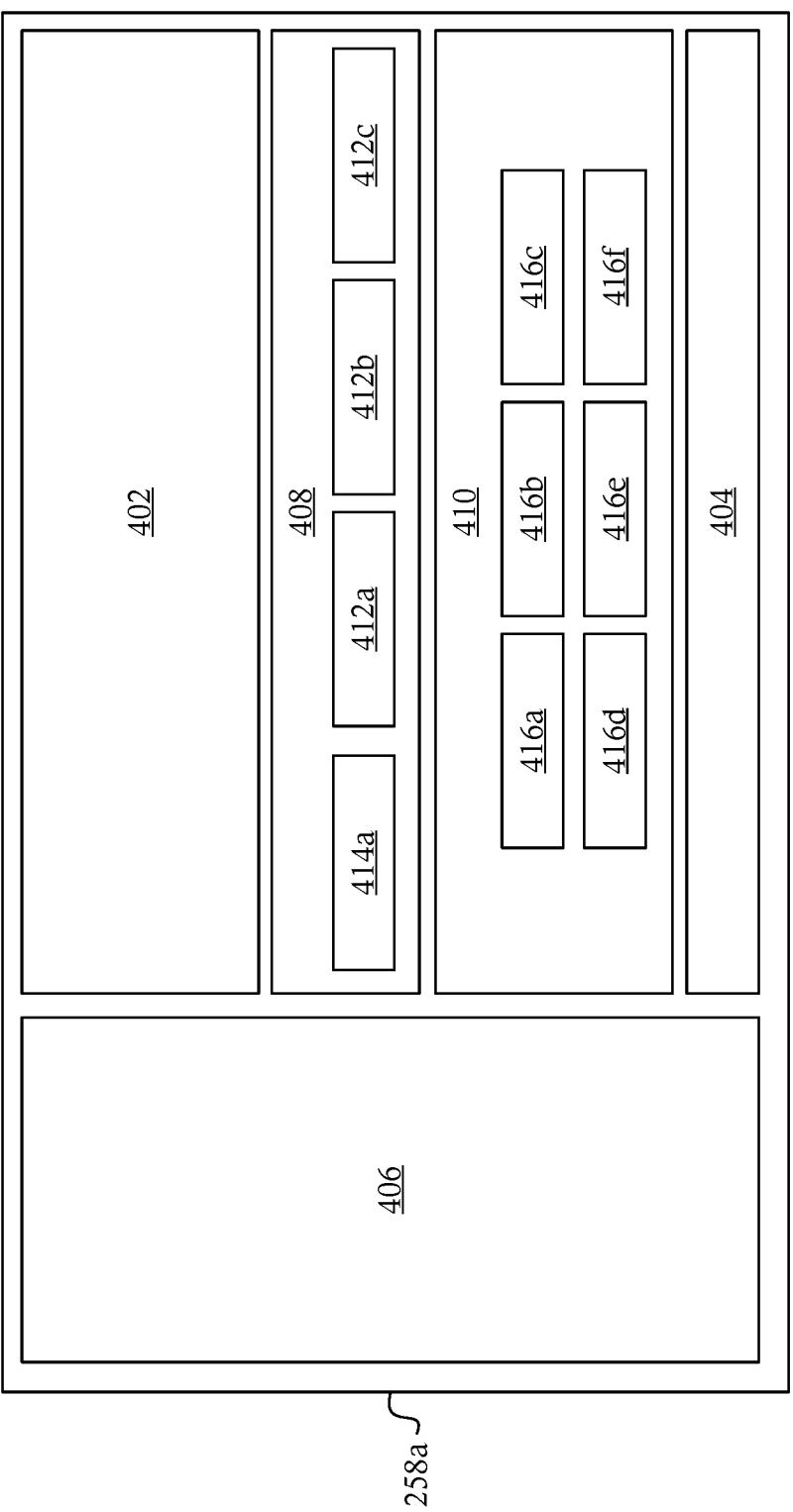
FIG. 9 illustrates an interface including a first content container containing a plurality of content elements associated with a first content campaign and a second plurality of content elements associated with a second content campaign, in accordance with some embodiments.
Figure 10:
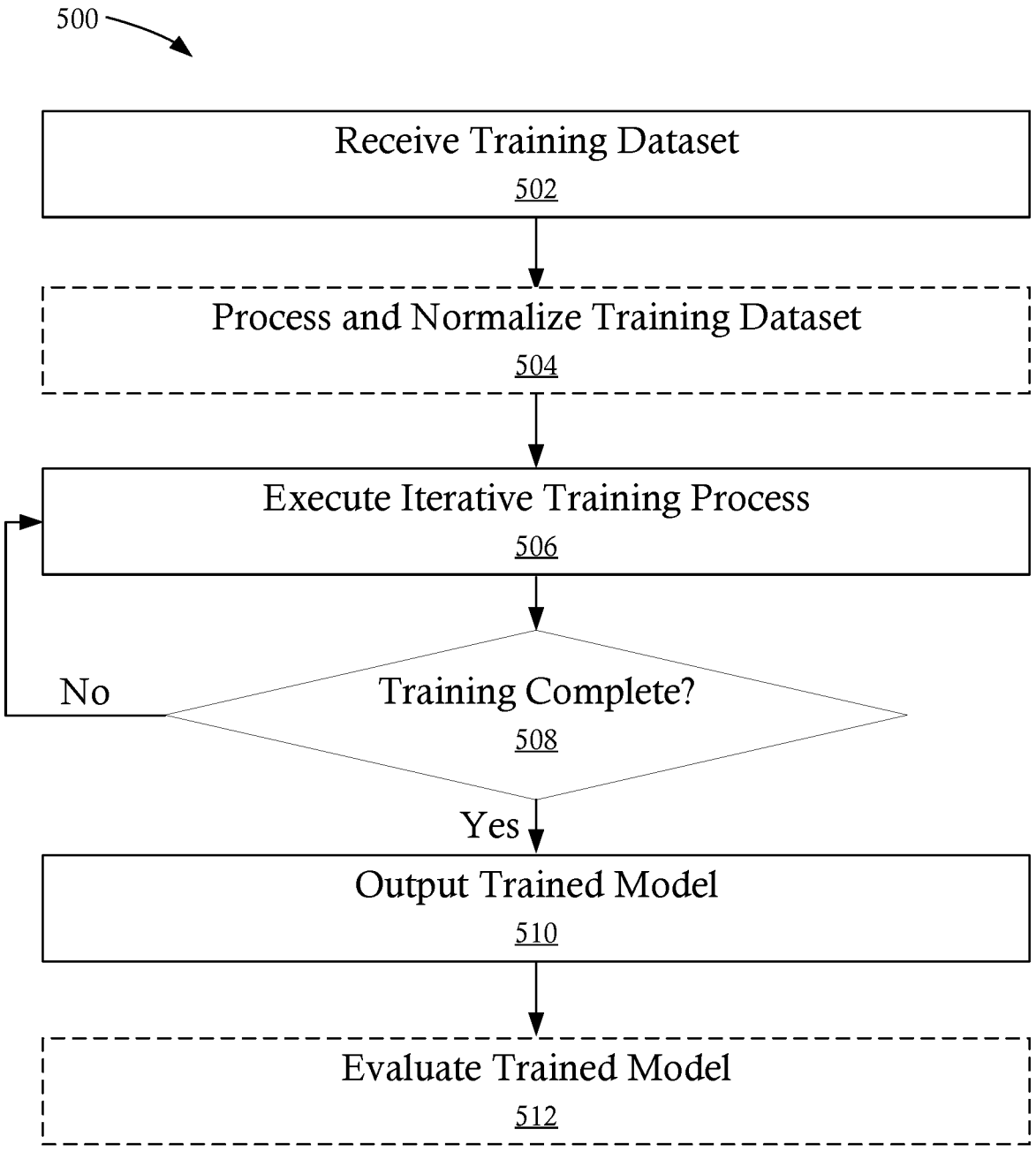
FIG. 10 illustrates a method for generating a trained machine learning model, in accordance with some embodiments.

FIG. 9 illustrates an improved interface 258a including a first content container 408 containing a plurality of amplified content elements 412a-412c associated with one or more selected content campaigns, in accordance with some embodiments. With reference to FIGS. 6-7 and 10, in some embodiments, the interface generation engine 256 is configured to generate an interface 258a by obtaining an interface template and populating the interface template with content elements related to and/or responsive to a query 254. For example, in some embodiments, an interface template can include one or more predefined portions, such as a header 402, a footer 404, a sidebar 406, a first content container 408, and a second content container 410. The interface generation engine 256 may be configured to insert predetermined content elements into one or more content containers. For example, in the illustrated embodiment, the improved interface 258a includes a first content container 408 configured to receive one or more amplified content elements 412a-412c and a second content container 410 configured to receive one or more search content elements 416a-416f. Although specific embodiments are discussed herein, it will be appreciated that additional and/or alternative elements can be included in an interface and/or interface template and/or illustrated portions of an interface and/or interface template can be omitted.

In some embodiments, the interface generation engine 256 is configured to insert one or more amplified content elements 414a-414c in the first content container 408 of the interface 258a. For example, as discussed above, the interface generation engine 256 may insert the first N content elements having a sequentially highest $pCTR_E$ value in the set of amplified content elements 270, a set of O content elements having a sequentially highest $pCTR_E$ value, where O is less than or greater than N, for a set of P content campaigns, where P is less than M, and/or any other combination of content elements selected from the set of amplified content elements 270. The amplified content elements 414a-414c include programmatically generated content elements configured to transition a user computing device 16, 18, 20 to additional interface pages, modify the interface 258a to include additional content based on the selected content element, and/or perform one or more functions (e.g., add-to-cart, purchase, etc.) associated with an item represented by a selected one of the amplified content elements 414a-414c.

In some embodiments, the interface 258a includes a content campaign identifier 414 for the included content campaign(s). For example, in the illustrated embodiments, the interface 258*a* includes a content campaign identifier 414 including a graphical content element associated with the content campaign. The content campaign identifier 414 can include any suitable campaign identifier, such as, for example, a brand identifier, a seasonal identifier, an item identifier, a category identifier, etc. In some embodiments, the content campaign identifier 414 is omitted.

In some embodiments, the interface generation engine 256 is configured to insert one or more content elements 416*a*-416*f* representative of at least a portion of the set of search results 264 in the second content container 410 of the interface 258*a*. For example, in the illustrated embodiment, the interface 258*a* includes content elements configured to provide programmatically generated links that transition a user computing device 16, 18, 20 to additional interface pages, modify the interface 258*a* to include additional content based on the selected content element, and/or perform one or more functions (e.g., add-to-cart, purchase, etc.).

With reference again to FIGS. 6-7, at step 212, the generated interface 258 (e.g., instructions for generating the interface 258 on a local display) is provided to the user computing device 16, 18, 20 that initially generated the interface request 252 for the interface. In some embodiments, the transmitted instructions automatically cause the receiving device to generate the interface 258. In some embodiments, the instructions cause the device to update or modify a portion of a default interface template and/or a preexisting page displayed via the device.

Identification of content elements associated with predefined content campaigns can be burdensome and time consuming for users, especially if such content elements are presented without consideration of user context, such as submitted search queries. Typically, a user can locate information regarding campaign content elements by navigating a browse structure, sometimes referred to as a "browse tree," in which interface pages or elements are arranged in a predetermined hierarchy. Such browse trees typically include multiple hierarchical levels, requiring users to navigate through several levels of browse nodes or pages to arrive at an interface page of interest. Thus, the user frequently has to perform numerous navigational steps to arrive at a page containing information regarding individual content elements related to items or other elements included in a content campaign.

Systems including a content amplification engine, as disclosed herein, significantly reduce this problem, allowing users to locate campaign content elements relevant to user search queries or other user context with fewer, or in some case no, active steps. For example, in some embodiments described herein, when a user is presented with content elements, such as campaign-associated content elements, each interface element includes, or is in the form of, a link to an interface page for an item represented by the content element and/or provides a function related to the content element. Each identified content element thus serves as a programmatically selected navigational shortcut to an interface page, allowing a user to bypass the navigational structure of the browse tree. Beneficially, programmatically identifying campaign-related content elements and presenting a user with navigations shortcuts to these tasks can improve the speed of the user's navigation through an electronic interface, rather than requiring the user to page through multiple other pages in order to locate the campaigns and/or content elements of a campaign via the browse tree or via a search function. This can be particularly beneficial for computing devices with small screens, where fewer interface elements can be displayed to a user at a time and thus navigation of larger volumes of data is more difficult.

With reference again to FIGS. 6-7, at optional step 214, feedback data 290 is received from the device that received the interface 258, e.g., a user computing device 16, 18, 20. The feedback data 290 is indicative of one or more interactions with the generated interface 258. Feedback data 290 can include, but is not limited to, interaction metrics such as click rates, add-to-cart, etc. The feedback data 290 can be provided directly from a user computing device 16, 18, 20 and/or can be obtained implicitly from interactions between a user computing device 16, 18, 20 and a system, such as the webs server 6. In some embodiments, the feedback data 290 can be stored in a database.

At optional step 216, one or more updated models can be generated based on the feedback data 290. For example, one or more of an exploration model and/or and updated exploitation model can be generated based on the received feedback data 290. In some embodiments, updated models are trained and deployed at a predetermined interval. Feedback data 290 obtained during the predetermined interval can be utilized to train a new model and/or refine an existing model, which is subsequently deployed and utilized for future interface generation processes, as described herein. In some embodiments, the one or more updated models are generated by a model generation engine 292.

Figure 11:
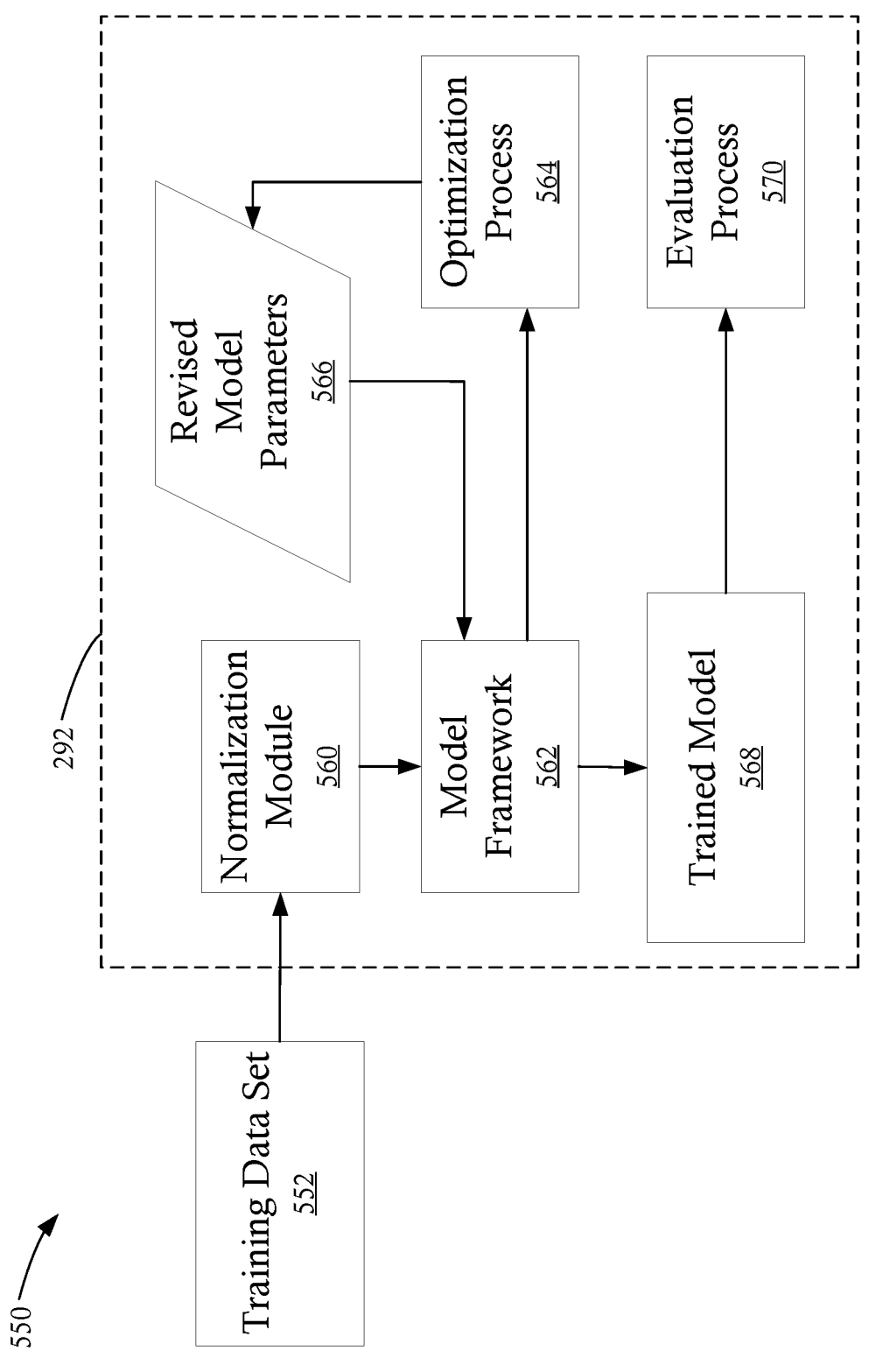
FIG. 11 is a process flow illustrating various steps of the method of generating a trained model, in accordance with some embodiments.

In some embodiments, a content amplification engine 268 can include one or more trained models, such as a trained exploration model and/or a trained exploitation model. In some embodiments, one or more trained models can be generated using an iterative training process based on a training dataset. FIG. 10 illustrates a method 500 for generating a trained model, such as a trained exploration model and/or a trained exploitation model, in accordance with some embodiments. FIG. 11 is a process flow 550 illustrating various steps of the method 500 of generating a trained model, in accordance with some embodiments. At step 502, a training dataset 552 is received by a system, such as a processing device 10. The training dataset 552 can include labeled and/or unlabeled data. For example, in some embodiments, a set of labeled and/or semi-labeled data is provided for use in training a model.

In some embodiments, the training dataset 552 includes historical interaction data. The historical interaction data can include data representative of interaction between one or more users with one or more generated interface pages, such as views, click rates, add-to-cart, etc. In some embodiments, the training dataset 552 includes item feature data. The item feature data can include one or more item features extracted for an item and/or one or more variants of an item included in an item catalog. Item features can include, but are not limited to, brand, style, department, size, color, flavor, format, print, material, finish, etc.

In some embodiments, the training dataset 552 includes at least partially labeled training data. For example, in some embodiments, the training dataset 552 consists of a plurality of input datasets each including one or more search queries, associated user features, one or more content campaigns, associated features, and a label for each input dataset identifying a set of ideal content elements. In some embodiments, the training dataset 552 includes identifiers for obtaining features from pre-existing feature sets stored in one or more storage locations. For example, in some embodiments, the training dataset 552 can include a set of reference identifiers for retrieving features from a relevant database.

In some embodiments, the training dataset 552 includes one or more precalculated values, such as similarity scores, exploration content scores, exploitation content scores, weighted scores, click-through-rates, etc. The precalculated values can include training input, e.g., values configured to be received by a model as an input, and/or as target outputs, e.g., precalculated final values for calculating a loss function of a model during iterative training. The relevant values can be generated using any suitable process, such as a previously generated model, algorithm, etc.

At optional step 504, the received training dataset 552 is processed and/or normalized by a normalization module 560. For example, in some embodiments, the training dataset 552 can be augmented by imputing or estimating missing values of one or more features associated with an item variant. In some embodiments, processing of the received training dataset 552 includes outlier detection configured to remove data likely to skew training of a variant-aware search engine and/or one or more sub-models. In some embodiments, processing of the received training dataset 552 includes removing features that have limited value with respect to training of the variant-aware search model (or related sub-models).

At step 506, an iterative training process is executed to train a selected model framework 562. The selected model framework 562 can include an untrained (e.g., base) machine learning model, such as an XGBoost framework, a Thompson Sampling framework, a Contextual Bandit Framework, and/or a partially or previously trained model (e.g., a prior version of a trained model). The training process is configured to iteratively adjust parameters (e.g., hyperparameters) of the selected model framework 562 to minimize a cost value (e.g., an output of a cost function) for the selected model framework 562. In some embodiments, the cost value is related to a match between predicted behavior, e.g., a set of selected content campaigns and a set of ideal or desired content campaigns results, a predicted interaction such as a click through or add-to-cart and actual interaction behavior, etc.

The training process is an iterative process that generates a set of revised model parameters 566 during each iteration. The set of revised model parameters 566 can be generated by applying an optimization process 564 to the cost function of the selected model framework 562. The optimization process 564 can be configured to reduce the cost value (e.g., reduce the output of the cost function) at each step by adjusting one or more parameters during each iteration of the training process.

In some embodiments, the iterative training process, e.g., the optimization process 564, may include a policy learning mechanism configured to automatically identify features and/or feature sets for inclusion in a model. For example, the policy learning mechanism may be configured to limit the features utilized by a trained model to a subset of features included in a training dataset in order to increase performance of a trained model with respect to predictions, e.g., increasing the likelihood of a click-through for a selected element for an exploitation and/or exploration model. In some embodiments, the iterative training process, e.g., the optimization process 564, may include a weighted smoothing factor applied to one or more parameters, such as, for example, a bandit mean, and/or variance parameters applied during optimization.

After each iteration of the training process, at step 508, a determination is made whether the training process is complete. The determination at step 508 can be based on any suitable parameters. For example, in some embodiments, a training process can complete after a predetermined number of iterations. As another example, in some embodiments, a training process can complete when it is determined that the cost function of the selected model framework 562 has reached a minimum, such as a local minimum and/or a global minimum.

At step 510, a trained model 568, such as a trained exploration model and/or a trained exploitation model, is output and provided for use in an interface generation method, such as the interface generation method 200 discussed above with respect to FIGS. 6-7. At optional step 512, a trained model 568 can be evaluated by an evaluation process 570. A trained model can be evaluated based on any suitable metrics, such as, for example, an F or F1 score, normalized discounted cumulative gain (NDCG) of the model, mean reciprocal rank (MRR), mean average precision (MAP) score of the model, and/or any other suitable evaluation metrics. Although specific embodiments are discussed herein, it will be appreciated that any suitable set of evaluation metrics can be used to evaluate a trained model.

Figure 12:
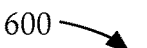
FIG. 12 is a flowchart illustrating an evaluation interface generation process, in accordance with some embodiments.
Figure 12:
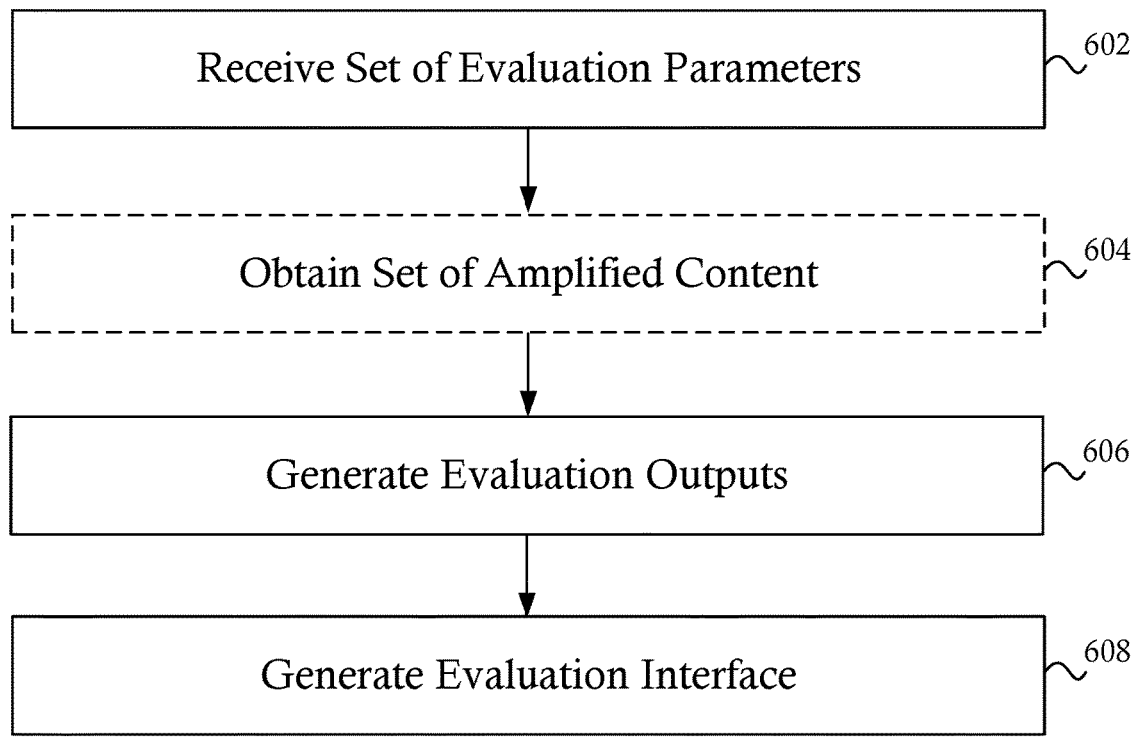
Figure 13:
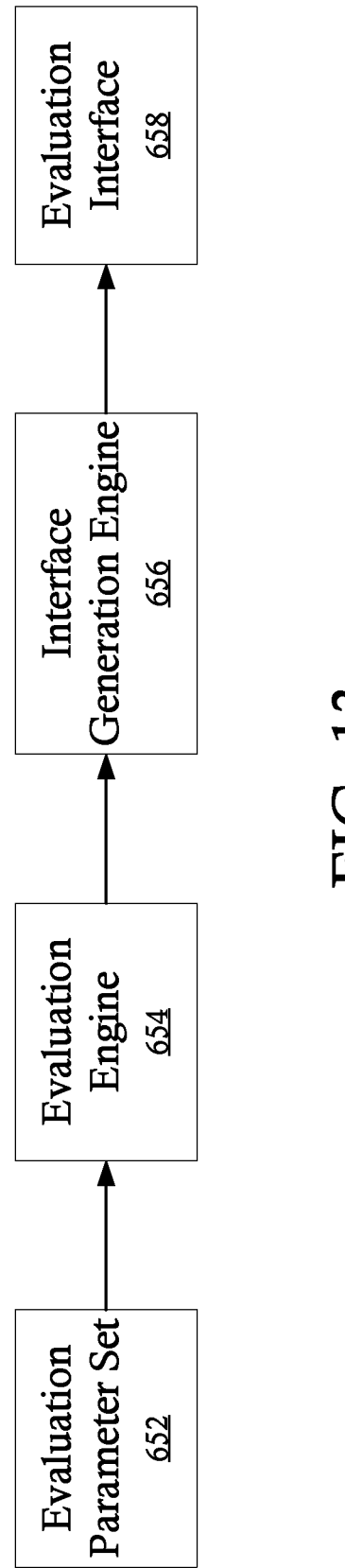
FIG. 13 is a process flow illustrating various steps of the evaluation interface generation process of FIG. 12, in accordance with some embodiments.

FIG. 12 is a flowchart illustrating an evaluation interface generation process 600, in accordance with some embodiments. FIG. 13 is a process flow 650 illustrating various steps of the evaluation interface generation process 600, in accordance with some embodiments. At step 602, a set of evaluation parameters 652 is received by an evaluation engine 654. The set of evaluation parameters 652 may include parameters defining one or more content campaigns in a pool of content campaigns 352 that may be included in a generated user interface, for example, as discussed above with respect to FIGS. 6-9. For example, the set of evaluation parameters 652 may include, but is not limited to, a query, one or more session settings defining a representative user session, parameters for operation of a content selection method, e.g., content selection method 300, etc.

At step 604, a set of amplified content is obtained based on the set of evaluation parameters 652. The amplified content may be generated according to any suitable process. For example, in some embodiments, the amplified content is generated according to the content selection method 300 described above in conjunction with FIGS. 6-9. As another example, in some embodiments, a set of historical amplified content, e.g., a set of amplified content previously generated in response to an amplified content request 266, is retrieved from a storage mechanism, such as a database 14.

At step 606, the evaluation engine 654 generates one or more outputs based on the set of amplified content. For example, in various embodiments, the evaluation engine 654 may be configured to generate outputs related to the selected and/or generated set of amplified content including campaign information (e.g., campaign definitions), parameters of the amplified content (e.g., reward values or bid values associated with the amplified content), content element/item information, retrieval information, ranking information, etc. It will be appreciated that any suitable metrics and/or outputs may be generated by the evaluation engine 654 based on the received set of amplified content.

At step 608, an evaluation interface 658 is generated. The evaluation interface 658 may be generated by an interface generation engine 656 configured to receive the one or more outputs from the evaluation engine 654. The interface generation engine 656 may be configured to obtain an evaluation interface template, for example from a database 14, and populate the evaluation interface template with the outputs received from the evaluation engine 654. The evaluation interface 658 may include, but is not limited to, query information, campaign information, individual item information, embedding information, etc. In some embodiments, the evaluation interface 658 may be used to evaluate the performance of a content selection method 300 and/or one or more underlying models implemented by a content selection method 300.

Although the subject matter has been described in terms of exemplary embodiments, it is not limited thereto. Rather, the appended claims should be construed broadly, to include other variants and embodiments, which can be made by those skilled in the art.

What is claimed is:

1. A system, comprising:
   a database configured to store a plurality of content campaigns, wherein each content campaign in the plurality of content campaigns includes at least one content element;
   a processor; and
   a non-transitory memory storing instructions that, when executed, cause the processor to:
   receive, from a requesting system, a request for an interface including a search query;
   generate, via a search engine, a set of search results responsive to the search query;
   select a set of initial content campaigns from the database based on a category associated with the search query, each of the initial content campaigns having an associated category;
   generate a query embedding for the search query and a content element embedding for each content campaign in the set of initial content campaigns;
   generate a first similarity sub-score based on the query embedding and each content element embedding, wherein each first similarity sub-score characterizes a similarity between the search query and the corresponding content campaign;
   generate a query taxonomy embedding for each category associated with the query;
   generate a content campaign taxonomy embedding for each category associated with each of the initial content campaigns;
   generate a second similarity sub-score based on the query taxonomy embedding and each content campaign taxonomy embedding, wherein each second similarity sub-score characterizes a similarity between the search query and the corresponding content campaign;
   generate a plurality of similarity scores based on the generated first similarity sub-scores and the generated second similarity sub-scores;
   filter the set of initial content campaigns based on the generated similarity scores to generate a set of candidate content campaigns;
   filter the set of candidate content campaigns based on an exploration content score and an exploitation content score to generate a set of final content campaigns;
   generate an interface including at least one content element selected from the content elements associated with a content campaign in the set of final content campaigns and at least one content element selected from the set of search results; and
   transmit the interface to the requesting system, wherein the requesting system is configured to display the interface on a display associated with the requesting system.

2. The system of claim 1, wherein the set of candidate content campaigns is filtered based on a combined content score comprising a first weighted combination of the exploration content score and the exploitation content score.

3. The system of claim 2, wherein the set of candidate content campaigns is filtered based on a second weighted combination of the first weighted combination and one or more of the similarity scores.

4. The system of claim 2, wherein the first weighted combination comprises a predicted click-through-rate for each content campaign in the set of candidate content campaigns.

5. The system of claim 1, wherein the exploration content score is generated by a trained model including an XGBoost framework.

6. The system of claim 1, wherein the exploitation content score is generated by a trained model including a Thompson Sampling framework.

7. The system of claim 1, wherein one or more of the similarity scores includes a cosine similarity of at least two embeddings.

8. The system of claim 7, wherein one or more of the similarity scores comprises a weighted combination of a first cosine similarity of a first embedding and a second embedding and a second cosine similarity of a third embedding and a fourth embedding.

9. A computer-implemented method, comprising:
   receiving, from a requesting system, a request for an interface including a search query;
   generating, via a search engine, a set of search results responsive to the search query;
   determining a category associated with the search query;
   selecting a set of initial content campaigns from a database based on the category associated with the search query and a category associated with each content campaign in the database, each of the initial content campaigns having an associated category;
   generating a query embedding for the search query and a content element embedding for each content campaign in the set of initial content campaigns;
   generating a first similarity sub-score based on the query embedding and each content element embedding, wherein each similarity score characterizes a similarity between the search query and the corresponding content campaign;
   generating a query taxonomy embedding for each category associated with the query;
   generating a content campaign taxonomy embedding for each category associated with each of the initial content campaigns;
   generating a second similarity sub-score based on the query taxonomy embedding and each content campaign taxonomy embedding, wherein each second similarity sub-score characterizes a similarity between the search query and the corresponding content campaign;
   generating a plurality of similarity scores based on the generated first similarity sub-scores and the generated second similarity sub-scores;
   selecting a set of candidate content campaigns from the set of initial content campaigns based on the similarity scores generated for the search query and each content campaign in the set of initial content campaigns;
   selecting a set of final content campaigns from the set of candidate content campaigns based on a combined content score comprising a weighted combination of an exploration content score and an exploitation content score;
   generating an interface including at least one content element selected from the content elements associated with a content campaign in the set of final content campaigns and at least one content element selected from the set of search results; and transmitting the interface to the requesting system, wherein the requesting system is configured to display the interface on a display associated with the requesting system.

10. The computer-implemented method of claim 9, wherein the set of final content campaigns is selected based on a weighted combination of the combined content score and one or more of the similarity scores.

11. The computer-implemented method of claim 9, wherein the exploration content score is generated by a trained model including an XGBoost framework.

12. The computer-implemented method of claim 9, wherein the exploitation content score is generated by a trained model including a Thompson Sampling framework.

13. The computer-implemented method of claim 9, wherein one or more of the similarity scores includes a cosine similarity of at least two embeddings.

14. The computer-implemented method of claim 13, wherein one or more of the similarity scores comprises a weighted combination of a first cosine similarity of a first embedding and a second embedding and a second cosine similarity of a third embedding and a fourth embedding.

15. A non-transitory computer-readable medium having instructions stored thereon that, when executed by a processor, cause a device to:

receive, from a requesting system, a request for an interface including a search query;

generate, via a search engine, a set of search results responsive to the search query;

determine a category associated with the search query;

select a set of initial content campaigns from a database based on the category associated with the search query and a category associated with each content campaign in the database, each of the initial content campaigns having an associated category;

generate a query embedding for the search query and a content element embedding for each content campaign in the set of initial content campaigns;

generate a first similarity sub-score based on the query embedding and each content element embedding, wherein each similarity score includes a cosine similarity and characterizes a similarity between the search query and the corresponding content campaign;

generate a query taxonomy embedding for each category associated with the query:

generate a content campaign taxonomy embedding for each category associated with each of the initial content campaigns;

generate a second similarity sub-score based on the query taxonomy embedding and each content campaign taxonomy embedding, wherein each second similarity sub-score characterizes a similarity between the search query and the corresponding content campaign;

generate a plurality of similarity scores based on the generated first similarity sub-scores and the generated second similarity sub-scores;

select a set of candidate content campaigns from the set of initial content campaigns based on the similarity scores generated for the search query and each content campaign in the set of initial content campaigns;

select a set of final content campaigns from the set of candidate content campaigns based on a combined content score comprising a weighted combination of an exploration content score and an exploitation content score;

generate an interface including at least one content element selected from the content elements associated with a content campaign in the set of final content campaigns and at least one content element selected from the set of search results; and transmit the interface to the requesting system, wherein the requesting system is configured to display the interface on a display associated with the requesting system.

16. The non-transitory computer-readable medium of claim 15, wherein the set of final content campaigns is selected based on a weighted combination of the combined content score and one or more of the similarity scores.

17. The non-transitory computer-readable medium of claim 16, wherein the set of final content campaigns comprises a set of N content campaigns selected from the set of initial content campaigns having a highest weighted combination of the combined content score and one or more of the similarity scores, where N is a positive integer.

18. The non-transitory computer-readable medium of claim 17, wherein the at least one content element selected from the content elements associated with the content campaign in the set of final content campaigns comprises a set of M content elements for each content campaign in the set of final content campaigns, where M is a positive integer.

19. The non-transitory computer-readable medium of claim 15, wherein the exploration content score is generated by a trained model including an XGBoost framework and the exploitation content score is generated by a trained model including a Thompson Sampling framework.

20. The non-transitory computer-readable medium of claim 15, wherein one or more of the similarity scores comprises a weighted combination of a first cosine similarity of a first embedding and a second embedding and a second cosine similarity of a third embedding and a fourth embedding.

* * * * *